(12) United States Patent
Torre

(10) Patent No.: US 9,253,854 B2
(45) Date of Patent: Feb. 2, 2016

(54) FLICKER COMPENSATION IN LIGHTING DEVICES

(71) Applicant: Crestron Electronics Inc., Rockleigh, NJ (US)

(72) Inventor: John Torre, Monroe, NY (US)

(73) Assignee: Crestron Electronics Inc., Rockleigh, NJ (US)

( * ) Notice: Subject to any disclaimer, the term of this patent is extended or adjusted under 35 U.S.C. 154(b) by 0 days.

(21) Appl. No.: 14/293,034

(22) Filed: Jun. 2, 2014

(65) Prior Publication Data

US 2015/0271894 A1 Sep. 24, 2015

Related U.S. Application Data

(60) Provisional application No. 61/969,621, filed on Mar. 24, 2014.

(51) Int. Cl.
*H05B 37/02* (2006.01)

(52) U.S. Cl.
CPC ..................................... *H05B 37/02* (2013.01)

(58) Field of Classification Search
CPC ....................................................... H05B 37/02
USPC .......... 315/291, 294, 297, 299, 306, 307, 308
See application file for complete search history.

(56) References Cited

U.S. PATENT DOCUMENTS

| 7,259,524 | B2 | 8/2007 | Hausman, Jr. et al. |
| 2010/0097002 | A1* | 4/2010 | Shatford ............ H05B 33/0803 315/210 |
| 2011/0012530 | A1* | 1/2011 | Zheng et al. ................... 315/294 |
| 2011/0109249 | A1* | 5/2011 | Liu et al. ........................ 315/307 |
| 2012/0176048 | A1* | 7/2012 | Li ....................... H05B 33/0815 315/186 |
| 2013/0187623 | A1* | 7/2013 | Harel ............................ 323/271 |
| 2013/0193877 | A1* | 8/2013 | Kuo .................... H05B 33/0818 315/307 |

* cited by examiner

*Primary Examiner* — Tung X Le
(74) *Attorney, Agent, or Firm* — Crestron Electronics Inc.

(57) ABSTRACT

A circuit (400) is described herein for controlling dimming of a lamp (112), the circuit comprising a switching circuit (422) configured to provide a chopped portion of an input AC power signal, a resettable inverting integrator circuit (426) configured to integrate the chopped portion of the input AC power signal such that a rise time of an output of the resettable inverting integrator circuit is proportional to a positive amplitude of the chopped portion of the input AC power signal and a fall time of the output of the resettable integrator is proportional to a negative amplitude of the chopped portion, such that an energy provided to the lamp based on the output of the resettable inverting integrator circuit is substantially equivalent from cycle-to-cycle of said input AC power signal regardless of a change in amplitude of the input AC power signal from cycle-to-cycle.

24 Claims, 12 Drawing Sheets

FLICKER COMPENSATION IN LIGHTING DEVICES

BACKGROUND OF THE INVENTION

1. Technical Field

The aspects of the embodiments described herein relate to an apparatus and method for correcting flicker situations encountered in the use of dimmer units for lighting controls.

2. Background Art

Lighting controls are prevalent in both home and commercial applications. Some lighting controls are very simple, e.g., on/off switches, but others include remote operation and dimming controls, which can be manual or automatic. Regardless of how the dimming controls are operated, it is important that dimming controls operate properly. As those of skill in the art can appreciate, while conventional dimming technology has been available for a very long time, there are still some problems with existing technologies.

One such problem in dimming controls is referred to as "flicker." Flicker is the condition in which the power or voltage that is transferred to the lamp is inconsistent over different cycles of 60 Hz or 50 Hz AC input voltage. This causes the lamp to become brighter and/or dimmer from cycle-to-cycle, ½ cycle to ½ cycle, or over multiple cycles, thereby exhibiting a flicker effect. While the human eye can average some discrepancies in different amounts of brightness over different cycles, due to, in part, its response time to light impulses, when the difference in amount of brightness due to changes in the control voltage reaches a certain threshold, the effect becomes significant. This can cause a reaction to those subjected to the flicker ranging from annoyance to headaches and other maladies. For example, photosensitive epilepsy (PSE) is a form of epilepsy in which seizures are triggered by visual stimuli that form patterns in time or space, such as flashing lights, bold, regular patterns, or regularly moving patterns.

As known by those of skill in the art, dimming controls conventionally "throttle" or control the amount of voltage that is applied to the lamp (for purposes of this discussion, the "lamp" can be incandescent, fluorescent, or a light emitting diode (LED)). This throttling is based on time; i.e., a 50% reduction in brightness would translate to cutting off the voltage transferred to the lamp about half-way through each of the positive and negative half cycles. This typically would occur when the AC voltage reaches either its positive maximum or its negative maximum. The amount of energy delivered to the lamp is dependent upon the voltage-time product provided in the waveform or voltage applied to the lamp.

FIG. 1 illustrates a conventional wall mounted dimming control apparatus (dimmer) 100 for use in housing conventional dimming control circuitry 108 (which is discussed in greater detail in regard to FIG. 2). In FIG. 1, conventional house AC power (Hot_Power) 102 and neutral 104 are input to wall-mounted box 106, which houses dimming control circuitry 108. The output of wall-mounted box 106 is DIM_Hot output 110, which is connected to a first connector of lamp 112, and a second connector of lamp 112 is connected to neutral 104, which is also received and used by dimming control circuitry 108. DIM_Hot output 110 is a controlled version of Hot_Power 102 that dims lamp 112. Control of DIM_Hot output 110 occurs through action of switch 114, which, as those of skill in the art can appreciate, is generally a rotatable potentiometer that provides a variable voltage to additional circuitry (discussed in FIG. 2) that assists in generating DIM_Hot output 110.

FIG. 2 illustrates conventional dimming control circuitry 108 in greater detail. Dimming control circuitry 108 includes FET drive circuitry 210, which resides on DIM switch board 216, switch 114, first opto-isolator 212, and second opto-isolator 214. Dimming control circuitry 108 further includes a bi-directional switch that includes first and second MOSFETs (transistors Q1, Q2) 206, 208, which receives, as respective input drive signals, FET_A_DRV_1 input signal 202 and FET_B_DRV_1 input signal 204, which are generated by operation of switch 114, FET drive circuitry 210, and first and second opto-isolators 212, 214. FET drive circuitry 210 is a conventional FET drive generation circuit for the control of transistors Q1 and Q2 206, 208 known to those of skill in the art, and therefore a detailed explanation of such is not necessary in fulfillment of the dual purposes of clarity and brevity. FET_A_DRV_1 input signal 202 controls transistor Q1 206 through first opto-isolator 212, which isolates the high voltage transistor Q1 206 from certain portions of the circuitry on FET drive circuitry 210, and FET_B_DRV_1 input signal 204 controls transistor Q2 208 in a similar manner (i.e., isolation via second opto-isolator 214), both of which act together to control the flow of 120 VAC, or Hot_Power 102 in the form of DIM_Hot output 110 to lamp 112. FET_A_DRV_1 input signal 202 and FET_B_DRV_1 input signal 204 are generated by other circuitry which is not shown or discussed in fulfillment of the dual purposes of clarity and brevity. DIM switch board 216 can contain the circuitry that not only creates FET_A_DRV_1 input signal 202 and FET_B_DRV_1 input signal 204, but also switch 114, and other circuitry as well.

FET_A_DRV_1 input signal 202 and FET_B_DRV_1 input signal 204 control dimming of lamp 112 in the following manner. FET_A_DRV_1 input signal 202 controls transistor Q1 206 on for the positive and negative going portions of Hot_Power 102, and FET_B_DRV_1 controls Q2 208 on for the positive and negative portions of Hot_Power 102. When FET_A_DRV_1 input signal 202 is active, it turns on transistor Q1 206, allowing it to act as switch. Similarly, when FET_B_DRV_1 204 is active, it turns on Q2 208 allowing it to also act as a switch. For positive portions of Hot_Power 102, the positive current can flow through transistor Q1 206 from its drain to its source, and through Q2 208 from its source to drain, and then out of the Dim_Hot output 110. FET_A_DRV_1 input signal 202 and FET_B_DRV_1 input signal 204 will be active for some portion of the positive and negative voltage cycle of Hot_Power 102, to control the dimming of lamp 112. For negative portions of Hot_Power 102, the negative current flows into Dim_Hot 110, through transistor Q2 208 from its drain to source, and then through Q1 206 from its source to drain. Typically, FET_A_DRV_1 input signal 202 and FET_B_DRV_1 input signal 204 are symmetrical, and gated in time to cause the correct dimming of lamp 112 as known by those of skill in the art.

FIG. 3 illustrates normal dimming control power voltage signal DIM_Hot output 110 when there is no over- or under-shoot situation in the input 120 VAC power waveform (Hot_Power 102) and a flicker-causing dimming control power voltage signal when there is both an over- and under-shoot situation in DIM_Hot output 110. In a first example, Hot_Power 102, which is input to the bi-directional switch shown in FIGS. 1 and 2, is controlled such that only 50% brightness is desired, so that in conventional FET drive circuitry 210, only half of the positive and half of the negative going portions of Hot_Power 102 is allowed to conduct to lamp 112, and the resulting waveform is DIM_Hot output 110a. It can be readily appreciated that about half of each of the positive and negative portions of each 120 VAC cycle is now output to lamp 112. Decreasing the amount of energy that reaches lamp 112 reduces the brightness emitted therefrom. Because there is little or no variation in input Hot_Power 102 and thus output DIM_Hot output 110a, this results in a substantially if not completely non-flicker situation because Hot_Power 102 and DIM_Hot output 110 are substantially uniform and the energy sent to lamp 112 has been reduced proportional to the dimming control signal.

However, in the second example of DIM_Hot output 110b, there is an over-voltage condition, caused by an over-voltage in Hot_Power 102, shown as waveform peak 302. DIM_Hot overshoot 110b will reach the same overshoot level (302) above the normal peak voltage of Hot_Power 102, occurring at about halfway through the positive cycle of the AC power waveform. Consequently, the amount of energy sent to lamp 112 is greater than that which is normally sent. The energy that is transferred during each positive ½ cycle of DIM_Hot output 110a is represented by and shown as first volt-sec product 306; note that second volt-sec product 308 is larger than volt-sec product 306 due to the increase in amplitude of DIM_Hot output 110b at the portion that has been identified as over-volt condition 302, and thus an increase in brightness will result. In under-volt condition 304, which represents an under-voltage condition, third volt-sec product 310 is less than first volt-sec product 306, and a decrease in brightness will result. Both the increase in brightness and decrease in brightness cause flicker.

Another approach to dimming controls is shown in U.S. Pat. No. 7,259,524 to Hausman, et al (the '524 Patent). In the '524 Patent, an apparatus and methods for regulating delivery of electrical energy to a lighting load are described. An electrical waveform is received from a source of electrical energy. An integration value is then generated based on a square of an amplitude of the received waveform. Electrical energy is delivered to the load until the integration value exceeds a threshold value. Thereafter, the delivery of electrical energy to the load is discontinued. As can be appreciated by those of skill in the art, and as can be seen from the '524 Patent, Hausman describes a dimming control system that is fairly complicated—referring just to FIG. 1, it can be seen that there are many circuit devices and signal processing steps involved to control the load on the lamp. That is, a microcontroller, comparator, pulse waveform generator, sawtooth generator and other devices are needed to accomplish the dimming function. Furthermore, the number of amplifiers used to accomplish the dimming function as outlined in FIGS. 8A-8E is about a dozen, and further includes at least two integrated circuits. As those of skill in the art can appreciate, this type of cumbersome approach can lead to premature failure because of the significant number of active components used, as well as required additional power.

Accordingly, it would be desirable to provide methods, modes and systems for improving dimming control circuitry to reduce or substantially eliminate flicker situations.

SUMMARY OF THE INVENTION

It is to be understood that both the general and detailed descriptions that follow are explanatory only and are not restrictive of the aspects of the embodiments.

According to a first aspect of the embodiments, a circuit is provided for controlling dimming of a lamp, the circuit comprising a switching circuit configured to provide a chopped portion of an input AC power signal, and a resettable inverting integrator circuit (426) configured to integrate the chopped portion of the input AC power signal such that a rise time of an output of the resettable inverting integrator circuit is proportional to a positive amplitude of the chopped portion of the input AC power signal and a fall time of the output of the resettable integrator is proportional to a negative amplitude of the chopped portion, such that an energy provided to the lamp based on the output of the resettable inverting integrator circuit is substantially equivalent from cycle-to-cycle of said input AC power signal regardless of a change in amplitude of the input AC power signal from cycle-to-cycle.

According to the first aspect, the circuit further comprises a pulse width modulating (PWM) circuit configured to generate a PWM signal, wherein a duty cycle of the PWM signal is directly proportional to a level of the input AC power signal, and further wherein the rise time of an output of the resettable integrator circuit increases as the duty cycle of the PWM signal decreases, and the fall time of the output of the resettable integrator increases as the duty cycle of the PWM signal decreases. According to the first aspect, said duty cycle of the PWM signal is averaged over a first plurality of cycles of the input AC power signal, and further wherein the first plurality of cycles of the input AC power signal is about three cycles.

According to the first aspect, the switching circuit comprises an analog switch with an analog input, a switched analog output, and a switching input, and wherein the analog input is connected to a scaled, non-inverted version of the input AC power signal, and wherein the switching input is connected to a pulsed gated signal that includes a gate-width on-time and a plurality of pulsed signals within said gate width on-time, wherein the gate width is proportional to a desired brightness setting of the lamp, and wherein a duty cycle of the plurality of pulsed signals is proportional to a magnitude of the input AC power signal. Still further according to the first aspect, a first duty cycle of the pulsed signals within the pulsed gated signal of about 50% represents a first magnitude of said input AC power signal, and further wherein a second duty cycle of the pulsed signals within the pulsed gated signal of about 100% represents a second magnitude of about two times the first magnitude.

Still further according to the first aspect of the embodiments, the resettable inverting integrator circuit comprises an inverting amplifier configured such that a first capacitor is placed in a feedback loop from an output of the inverting amplifier to an inverting input of the inverting amplifier and a first end of a first resistor is connected to the inverting input of the inverting amplifier and a second end of the first resistor is connected to an input signal. The resettable inverting integrator circuit further comprises a reset transistor configured such that a drain connection is connected to the output of the inverting amplifier, a source connection is connected to the inverting input of the inverting amplifier, and a gate is connected to a 60 Hz positive transition reset signal. According to the first aspect, when a 60 Hz positive transition reset signal pulse is received following a positive transition of the input AC power signal, the reset transistor is configured to cause a charge accumulated across the first capacitor to discharge upon each positive transition of the input AC power signal.

According to the first aspect of the embodiments, the circuit further comprises a non-inverting amplifier. The non-inverting amplifier according to the first aspect includes an input connected to a scaled version of the input AC power signal. The non-inverting amplifier is configured to buffer an input signal impedance from circuitry connected to an output of the non-inverting amplifier. The output of the non-inverting amplifier is configured to generate a scaled, non-inverted version of the input AC power signal substantially equal in magnitude and polarity to the input signal. The circuit according to the first aspects further includes an analog switch with an analog input, a switched analog output, and a switching input. According to the first aspects, the analog input of the analog switch is connected to a scaled, non-inverted version of the input AC power signal, and the switching input is connected to a pulsed gated signal that includes a gate-width on-time and a plurality of pulsed signals within said gate width on-time. The gate width according to the first aspects is proportional to an on-time of the lamp, and a duty cycle of the plurality of pulsed signals is proportional to a magnitude of the input AC power signal.

Still further according to the first aspect of the embodiments, the circuit further comprises a dimming level circuit configured to generate a dimming level signal proportional to a predetermined brightness level, and a zero reference setting signal, set equal to about 10 mV above zero volts, wherein the zero reference setting signal represents a turn off condition of the lamp. The circuit according to the first aspect of the embodiments further includes a 120 HZ zero volt transition signal, configured to provide a pulse on each zero voltage transition of the AC power signal, a comparator circuit, and a latch circuit (436). The latch circuit according to the first aspect is configured to compare the output of the resettable inverting integrator circuit to both of the dimming setting and zero reference signals and generate a latched lamp drive signal, such that when a first 120 HZ zero voltage transition occurs during a positive transition of a first AC power signal, a lamp drive signal is generated, in response to said output of the resettable integrator circuit, to turn the lamp on until the output of the resettable integrator circuit is substantially equal to the dimming level signal, whereupon the comparator and latch circuit are configured to turn off the lamp, and when a second 120 HZ zero voltage transition occurs during a negative transition of the first AC power signal, a lamp drive signal is generated, in response to said output of the resettable integrator circuit, to turn the lamp on until the output of the resettable integrator circuit is substantially equal to the zero reference setting signal, whereupon the comparator and latch circuit are configured to turn off the lamp.

According to a second aspect of the embodiments, a circuit for controlling dimming of a lamp is provided comprising a pulse width modulating (PWM) circuit configured to generate a PWM signal. According to the second aspect of the embodiments, a duty cycle of the PWM signal is directly proportional to a level of the input AC power signal. The circuit according to the second aspect of the embodiments further includes an analog switching circuit configured to provide a chopped portion of an input AC power signal, wherein said analog switching circuit includes an analog input, a switched analog output, and a switching input. According to the second aspect of the embodiments the analog input is connected to a scaled, non-inverted version of the input AC power signal, and the switching input is connected to the PWM signal that includes a gate-width on-time and a plurality of pulsed signals within said gate width on-time. According to the second aspect of the embodiments, the gate width is proportional to a desired brightness setting of the lamp, and a duty cycle of the plurality of pulsed signals in the PWM signal is proportional to a magnitude of the input AC power signal. According to the second aspect of the embodiments, a resettable inverting integrator circuit is further includes and configured to integrate the chopped portion of the input AC power signal, and a rise time of an output of the resettable inverting integrator circuit is proportional to a positive amplitude of the chopped portion of the input AC power signal, and a fall time of the output of the resettable inverting integrator circuit is proportional to a negative amplitude of the chopped portion, and further wherein an energy provided to the lamp based on the output of the resettable inverting integrator circuit is substantially equivalent from cycle-to-cycle of said input AC power signal regardless of a change in amplitude of the input AC power signal from cycle-to-cycle, and further wherein the rise time of an output of the resettable inverting integrator circuit increases as the duty cycle of the PWM signal decreases, and the fall time of the output of the resettable inverting integrator circuit increases as the duty cycle of the PWM signal decreases.

According to the second aspect of the embodiments, a first duty cycle of the pulsed signals within the pulsed gated signal of about 50% represents a first magnitude of said input AC power signal, and further wherein a second duty cycle of the pulsed signals within the pulsed gated signal of about 100% represents a second magnitude of about two times the first magnitude. Still further according to the second aspect, said duty cycle of the PWM signal is averaged over a first plurality of cycles of the input AC power signal, and wherein the first plurality of cycles of the input AC power signal is about three cycles.

According to the second aspect, the resettable inverting integrator circuit comprises an inverting amplifier configured such that a first capacitor is placed in a feedback loop from an output of the inverting amplifier to an inverting input of the inverting amplifier and a first end of a first resistor is connected to the inverting input of the inverting amplifier and a second end of the first resistor is connected to an input signal, and a reset transistor is configured such that a drain connection is connected to the output of the inverting amplifier, a source connection is connected to the inverting input of the inverting amplifier, and a gate is connected to a 60 Hz positive transition reset signal.

According to the second aspect, when a 60 Hz positive transition reset signal pulse is received following a positive transition of the input AC power signal, the reset transistor is configured to cause a charge accumulated across the first capacitor to discharge upon each positive transition of the input AC power signal, and wherein a first duty cycle of the pulsed signals within the pulsed gated signal of about 50% represents a first magnitude of said input AC power signal, and further wherein a second duty cycle of the pulsed signals within the pulsed gated signal of about 100% represents a second magnitude of about two times the first magnitude.

According to the second aspect the circuit further comprises a dimming level circuit configured to generate a dimming level signal proportional to a predetermined brightness level, a zero reference setting signal, set equal to about 10 mV above zero volts, wherein the zero reference setting signal represents a turn off condition of the lamp. According to the second aspect, the circuit further comprises a 120 HZ zero volt transition signal and is configured to provide a pulse on each zero voltage transition of the AC power signal, a comparator circuit and a latch circuit. According to the second aspect, the latch circuit is configured to compare the output of the resettable inverting integrator circuit to both of the dimming setting and zero reference signals and generate a latched lamp drive signal, such that when a first 120 HZ zero voltage transition occurs during a positive transition of a first AC power signal, a lamp drive signal is generated, in response to said output of the resettable inverting integrator circuit, to turn the lamp on until the output of the resettable integrator circuit is substantially equal to the dimming level signal, whereupon the comparator and latch circuit are configured to turn off the lamp, and when a second 120 HZ zero voltage transition occurs during a negative transition of the first AC power signal, a lamp drive signal is generated, in response to said output of the resettable integrator circuit, to turn the lamp on until the output of the resettable integrator circuit is substantially equal to the zero reference setting signal, whereupon the comparator and latch circuit are configured to turn off the lamp.

According to a third aspect of the embodiments, a method for controlling dimming of a lamp is provided, the method comprising providing a chopped portion of an input AC power signal, integrating the chopped portion of the input AC power signal in a resettable inverting integrator circuit such that a rise time of an output of the resettable inverting integrator circuit is proportional to a positive amplitude of the chopped portion of the input AC power signal and a fall time of the output of the resettable inverting integrator circuit is proportional to a negative amplitude of the chopped portion, such that an energy provided to the lamp based on the output of the resettable inverting integrator circuit is substantially equivalent from cycle-to-cycle of said input AC power signal regardless of a change in amplitude of the input AC power signal from cycle-to-cycle.

According to the third aspect, the method further comprises generating pulse width modulated signal using a PWM circuit, wherein a duty cycle of the PWM signal is directly proportional to a level of the input AC power signal. According to the third aspect, the rise time of an output of the resettable inverting integrator circuit increases as the duty cycle of the PWM signal decreases, and the fall time of the output of the resettable inverting integrator circuit increases as the duty cycle of the PWM signal decreases. According to the third aspect, the duty cycle of the PWM signal is averaged over a first plurality of cycles of the input AC power signal, and according to the third aspect of the embodiments, the first plurality of cycles of the input AC power signal is about three cycles.

According to the third aspect, the step of providing a chopped portion of an input AC power signal comprises connecting an input of an analog switch with a scaled, non-inverted version of the input AC power signal, and connecting a switching input of the analog switch to a pulsed gated signal that includes a gate-width on-time and a plurality of pulsed signals within said gate width on-time. According to the third aspect, the gate width is proportional to a desired brightness setting of the lamp, and a duty cycle of the plurality of pulsed signals is proportional to a magnitude of the input AC power signal. According to the third aspect, a first duty cycle of the pulsed signals within the pulsed gated signal of about 50% represents a first magnitude of said input AC power signal, and further wherein a second duty cycle of the pulsed signals within the pulsed gated signal of about 100% represents a second magnitude of about two times the first magnitude.

According to the third aspect of the embodiments, the step of integrating the chopped portion of the input AC power signal comprises amplifying the chopped portion of the input AC signal through an inverting amplifier configured such that a first capacitor is placed in a feedback loop from an output of the inverting amplifier to an inverting input of the inverting amplifier and a first end of a first resistor is connected to the inverting input of the inverting amplifier and a second end of the first resistor is connected to an input signal. According to the third aspect, the step of integrating further comprises resetting the output of the inverting amplifier through operation of a reset transistor configured such that a drain connection is connected to the output of the inverting amplifier, a source connection is connected to the inverting input of the inverting amplifier, and a gate is connected to a 60 Hz positive transition reset signal, and wherein resetting occurs upon each positive transition of the 60 Hz positive transition reset signal pulse such that the reset transistor causes a charge accumulated across the first capacitor to discharge.

According to the third aspect, the method further comprises providing the output of the integrator circuit to a comparator/latch circuit, such that when the output of the resettable inverting integrator circuit rises from about 0 Volts to the level of the DC DS Level signal, the lamp is turned on, and when the output of the resettable inverting integrator circuit falls from about the level of the DC DS level signal, the lamp is turned on, and during other times, the lamp is off.

DISCLOSURE OF INVENTION

The embodiments seek to overcome or at least ameliorate one or more of several problems, including but not limited to: substantially reducing or eliminating flicker conditions when dimming lamps.

BRIEF DESCRIPTION OF DRAWINGS

The accompanying figures further illustrate aspects of the embodiments.

The components in the drawings are not necessarily drawn to scale, emphasis instead being placed upon clearly illustrating the principles of the embodiments. In the drawings, like reference numerals designate corresponding parts throughout the several views.

BRIEF DESCRIPTION OF THE SEVERAL VIEWS OF THE DRAWING

Figure 1:
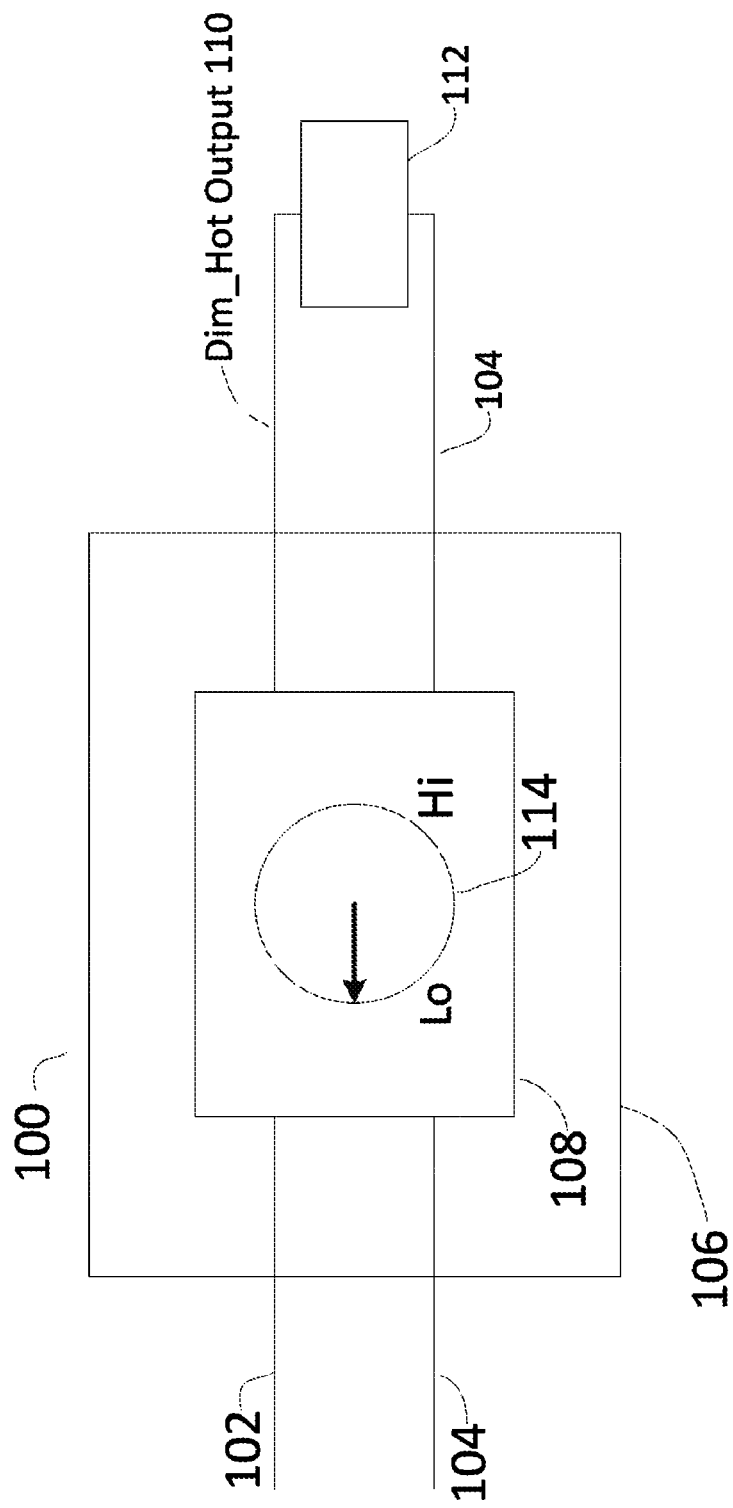

FIG. 1 illustrates a conventional wall mounted plate for use in housing dimming control circuitry.

Figure 2:
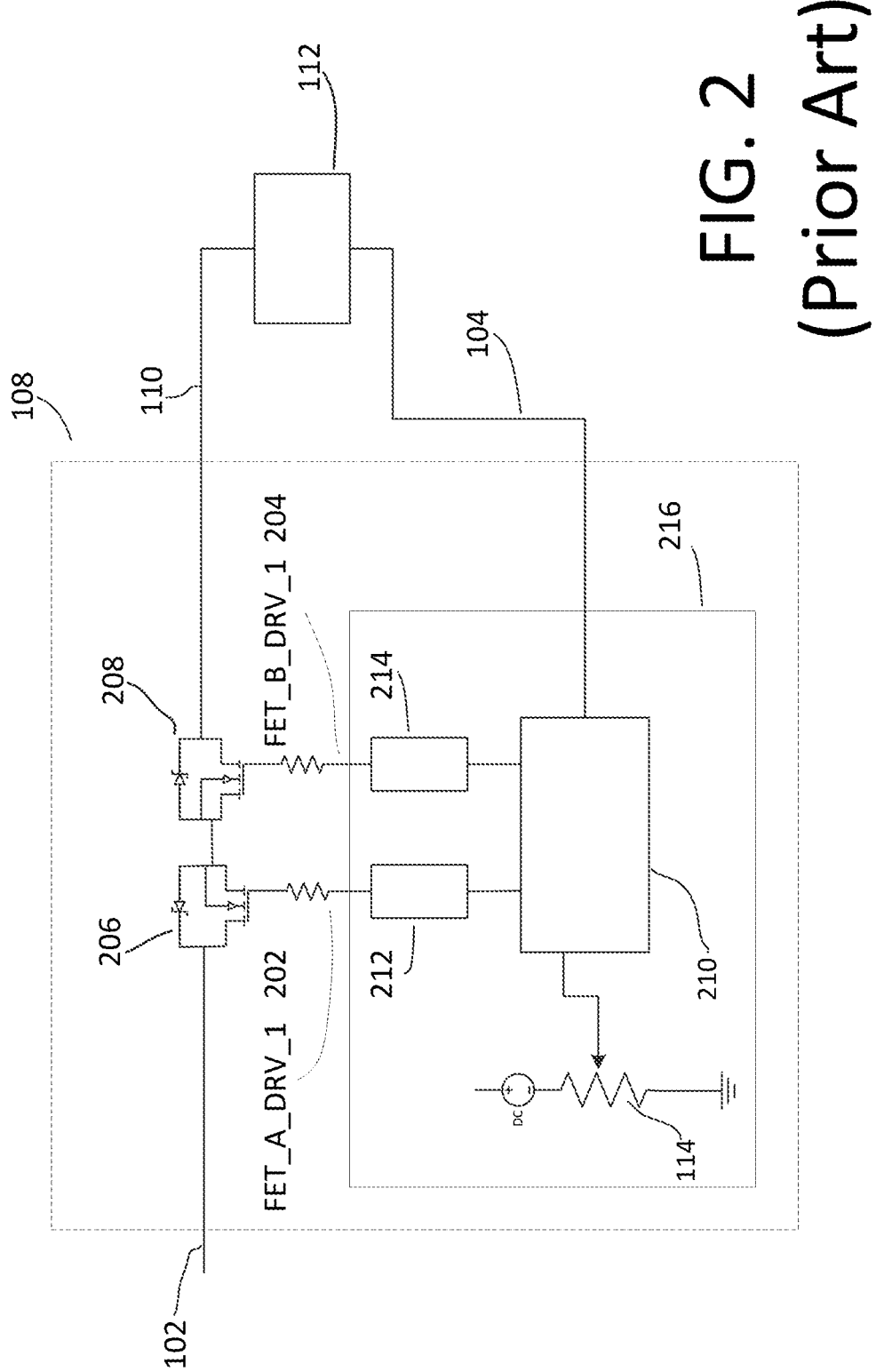

FIG. 2 illustrates a conventional bi-directional Metal Oxide Semi-conductor Field Effect Transistor (MOSFET) switch for use in a dimmer circuit for controlling an amount of voltage input to one or more lamps.

Figure 3:
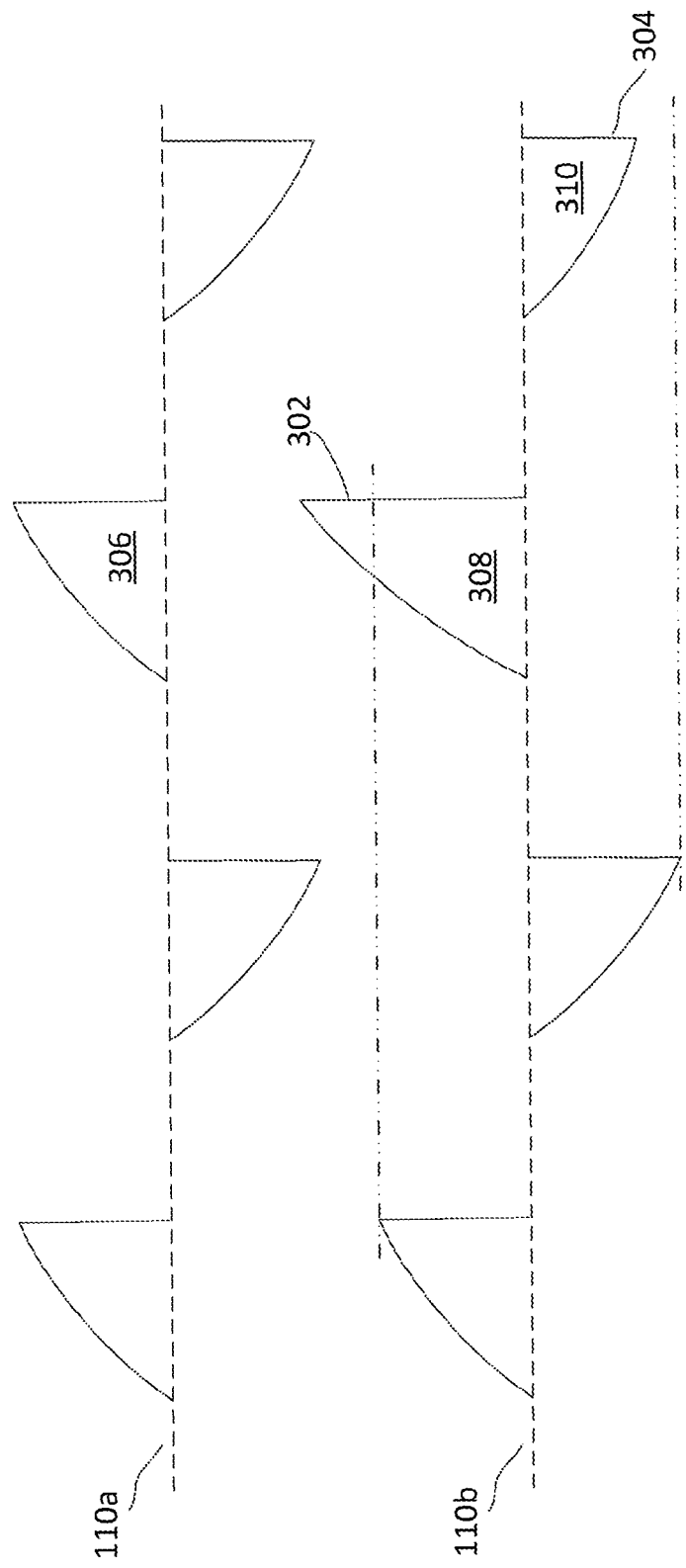

FIG. 3 illustrates a first 120 VAC power waveform for dimming lighting without significant under-voltage and/or over-voltage conditions, and a second 120 VAC power waveform for dimming lighting with both noticeable under-voltage and/or over-voltage conditions.

FIGS. 4A-4D illustrate a circuit for use in dimming lamps substantially without flicker through use of both volt-second integration mode and a feed forward circuit for a constant power mode according to an embodiment.

Figure 4A:
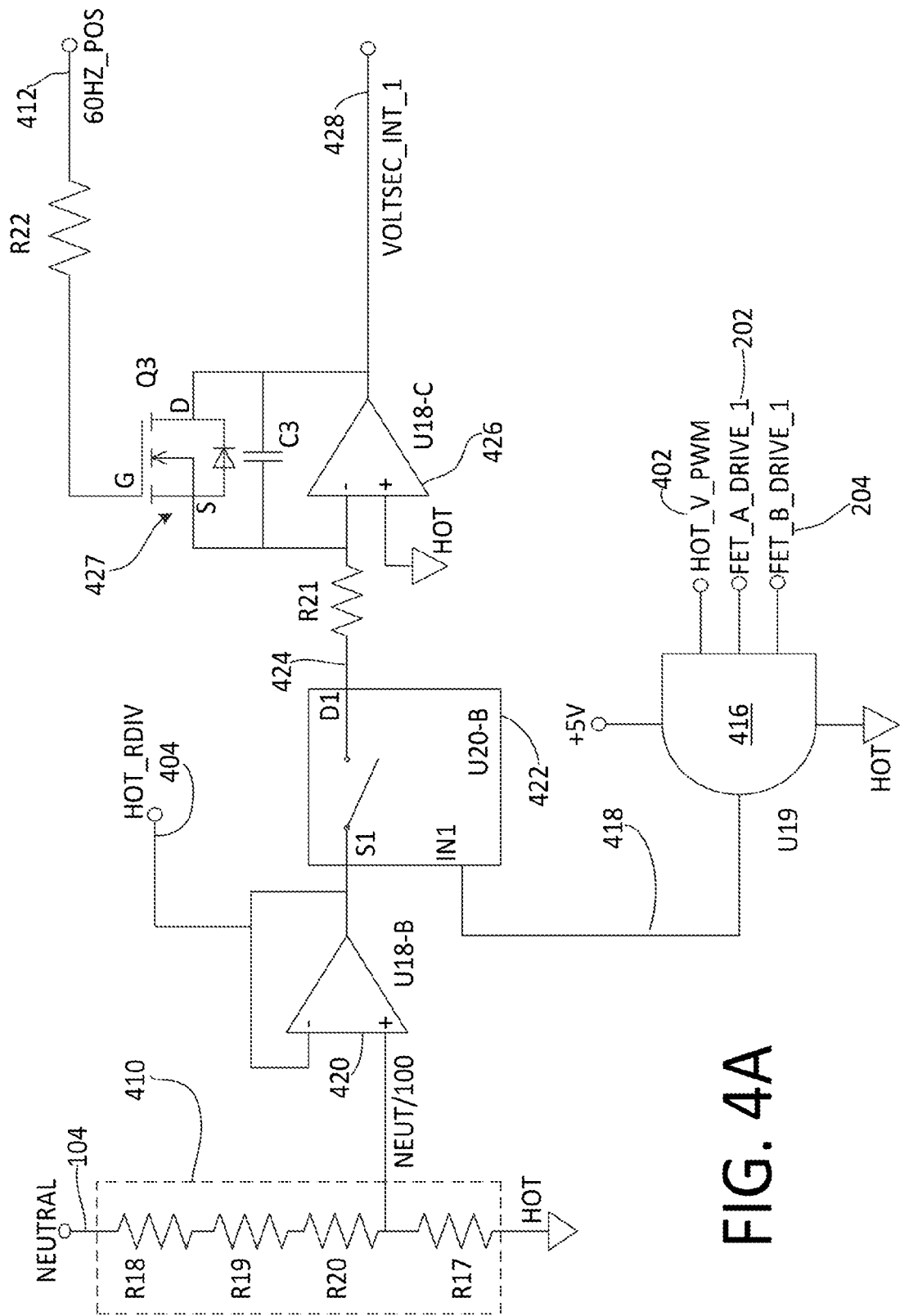
Figure 4B:
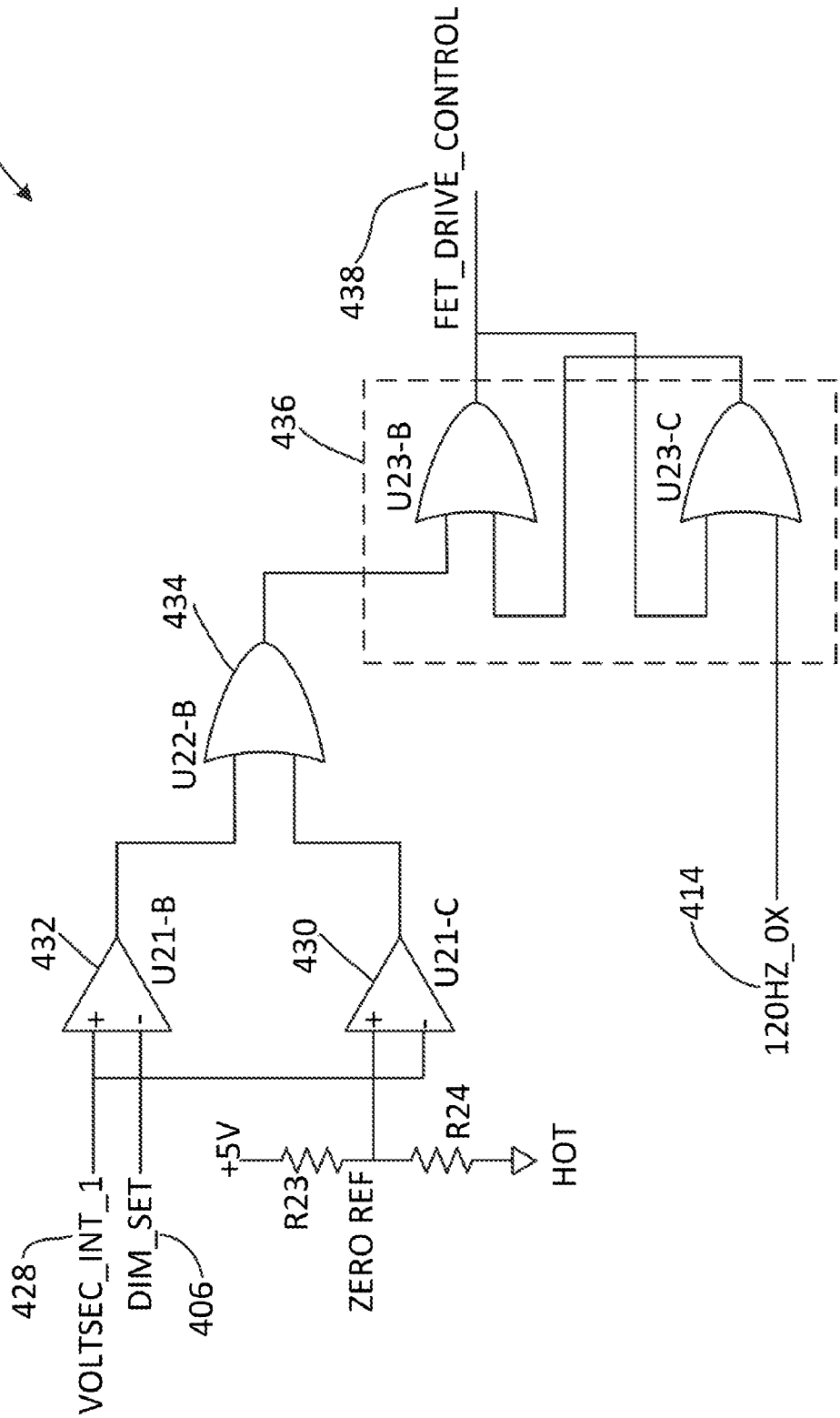
Figure 4C:
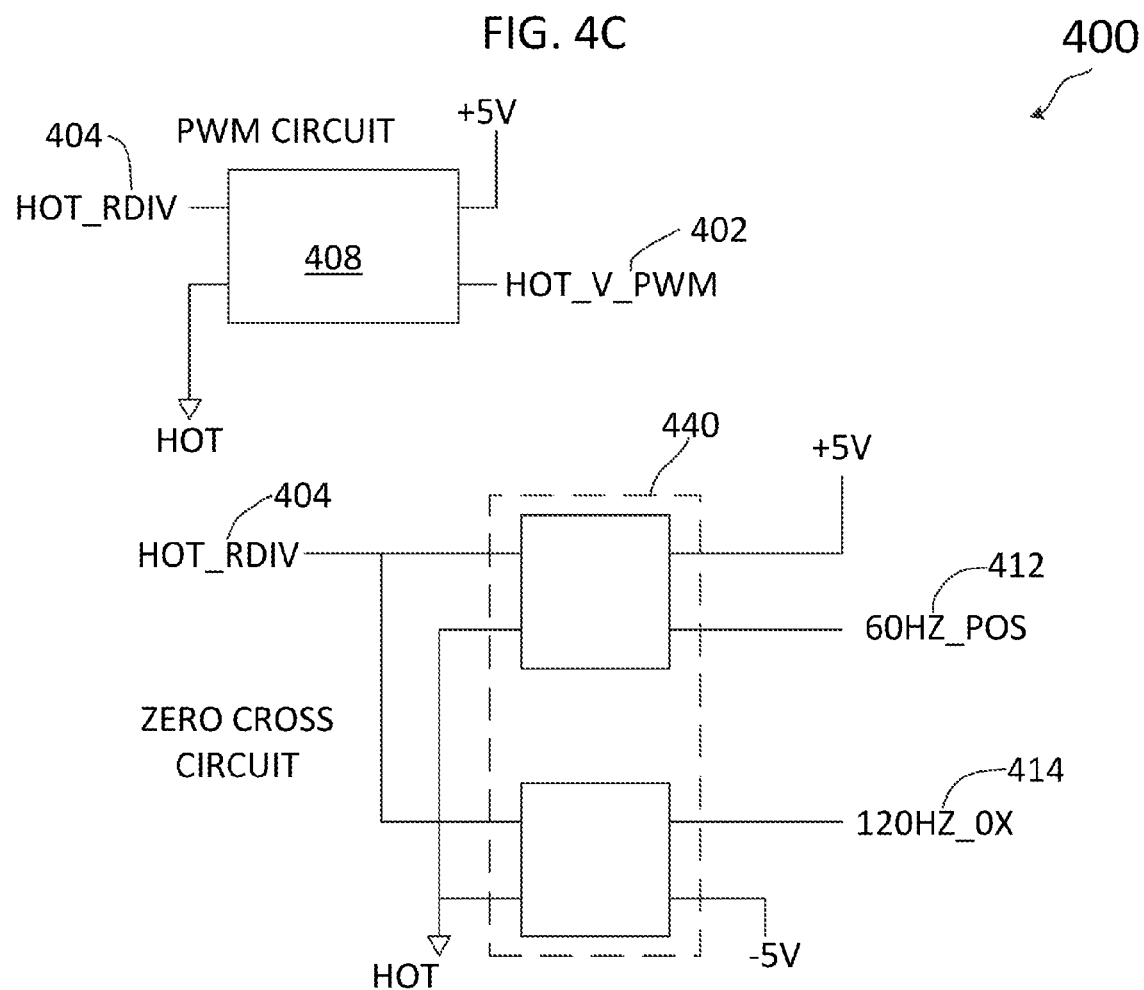
Figure 4D:
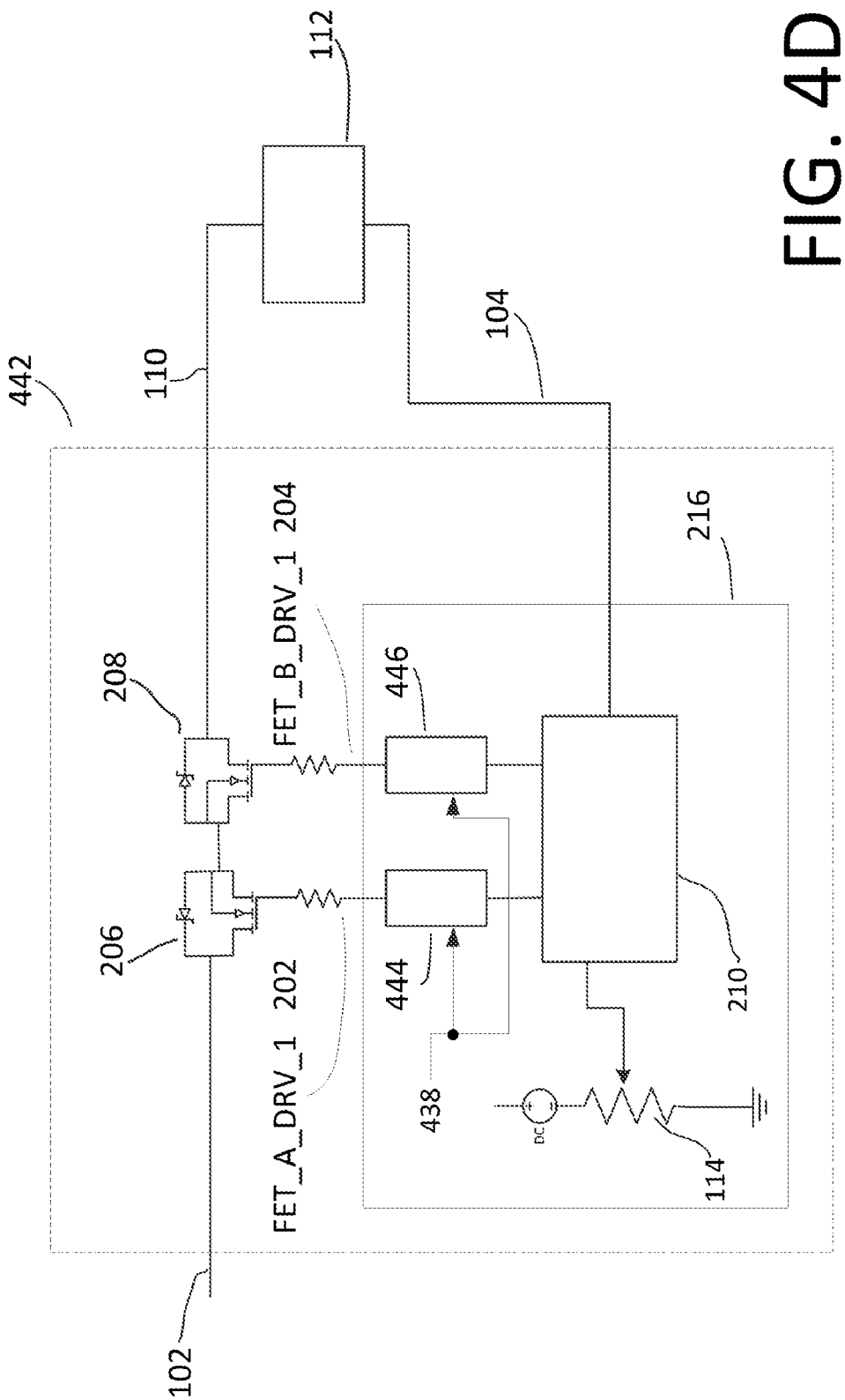
Figure 5:
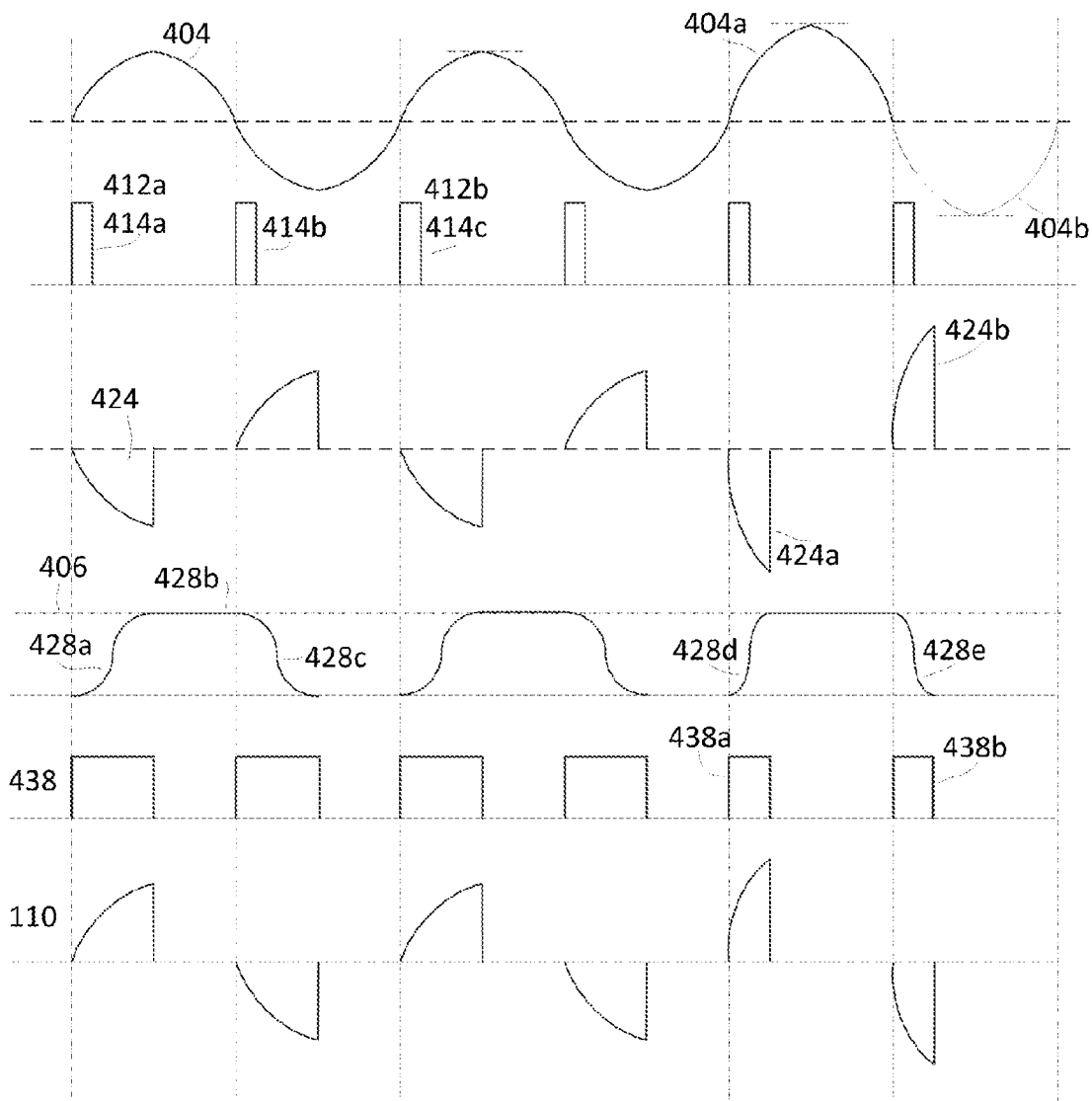

FIG. 5 illustrates a plurality of waveforms generated by, or used within, the circuit illustrated in FIG. 4 when used according to the volt-second integration mode according to an embodiment.

Figure 6:
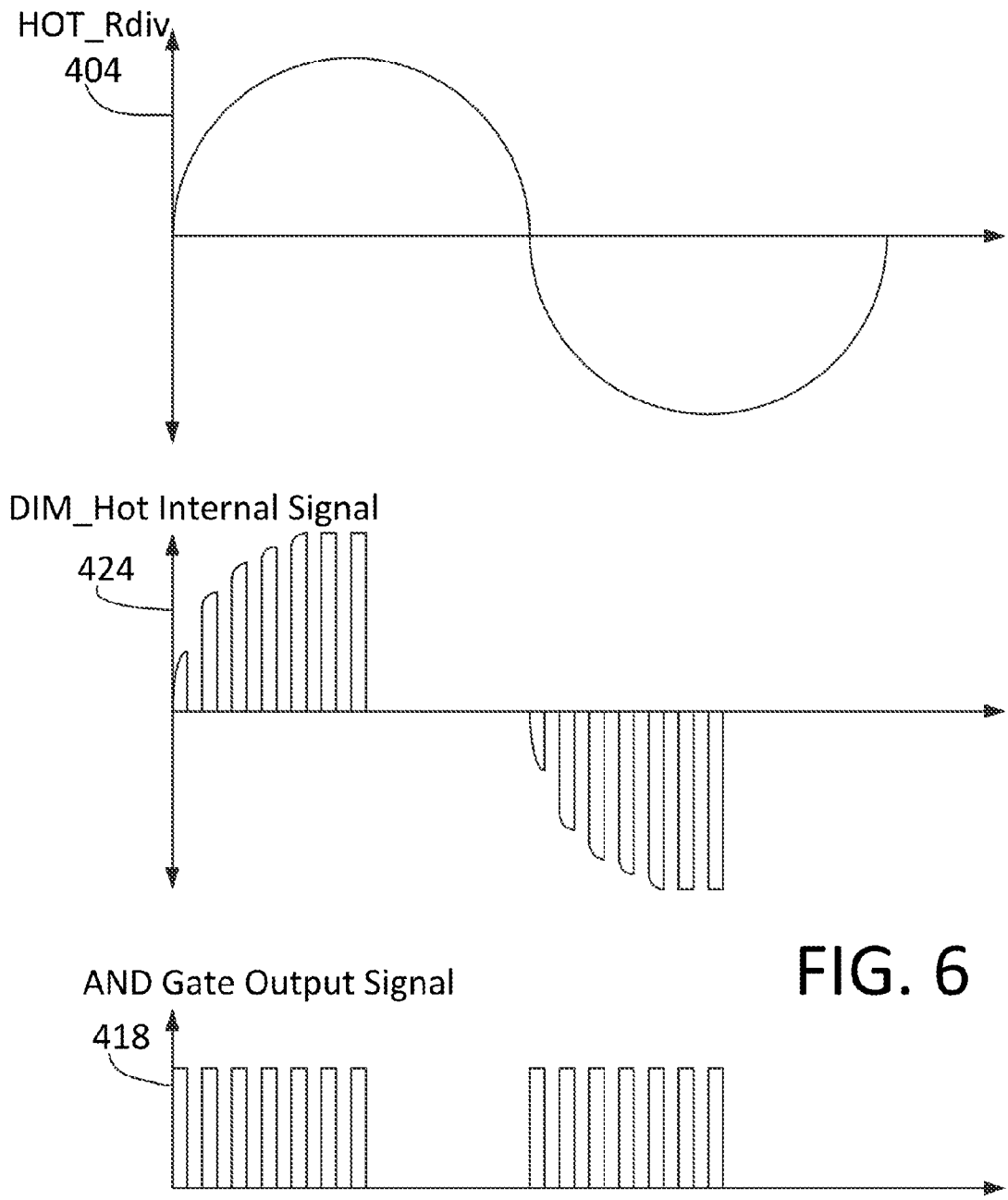

FIG. 6 illustrates a close-up view of a portion of one of the waveforms shown in FIG. 5 showing operation of an analog switch according to an embodiment.

Figure 7:
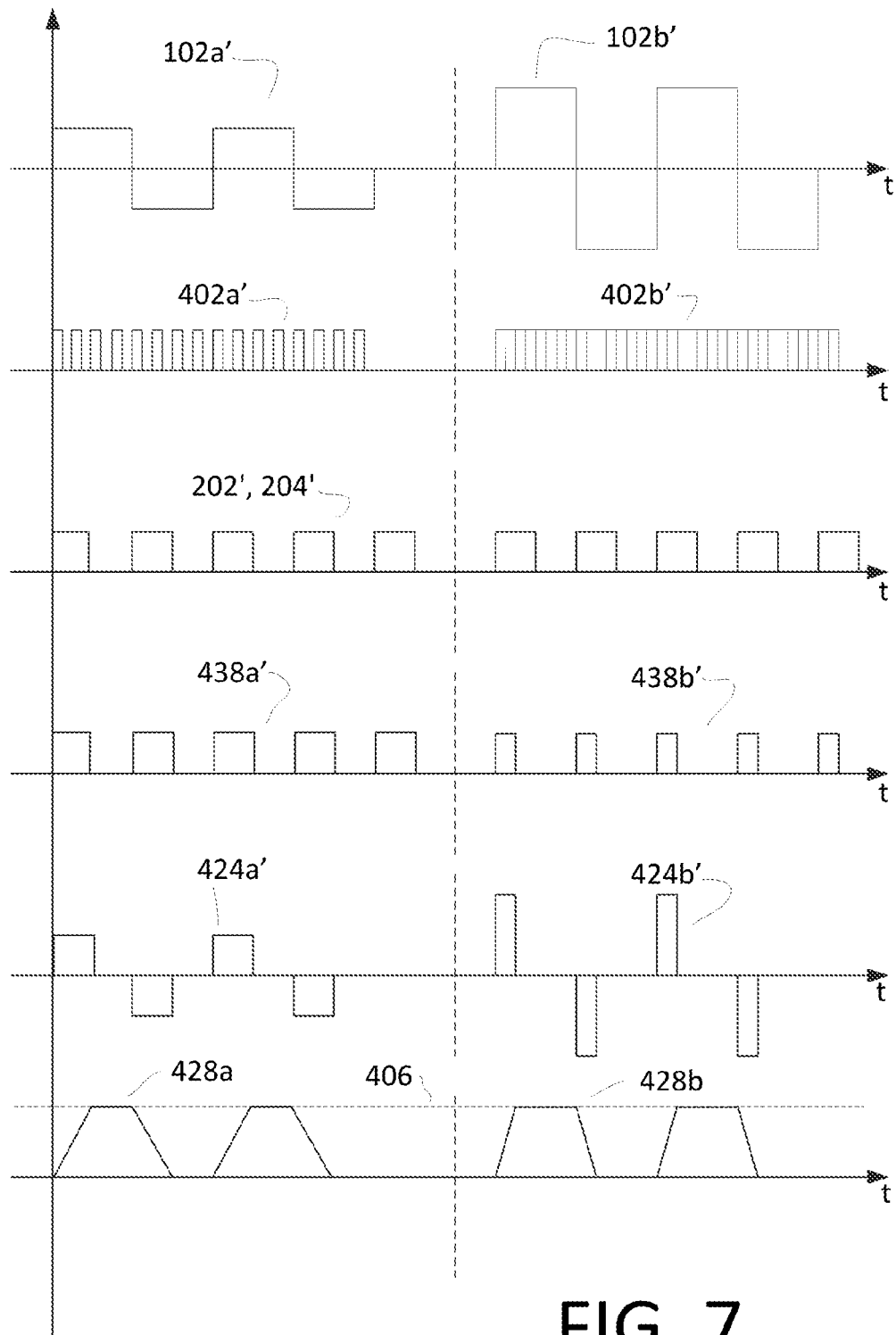

FIG. 7 illustrates a plurality of waveforms generated by, or used within, the circuit illustrated in FIG. 4 when used according to the constant power mode according to an embodiment.

Figure 8:
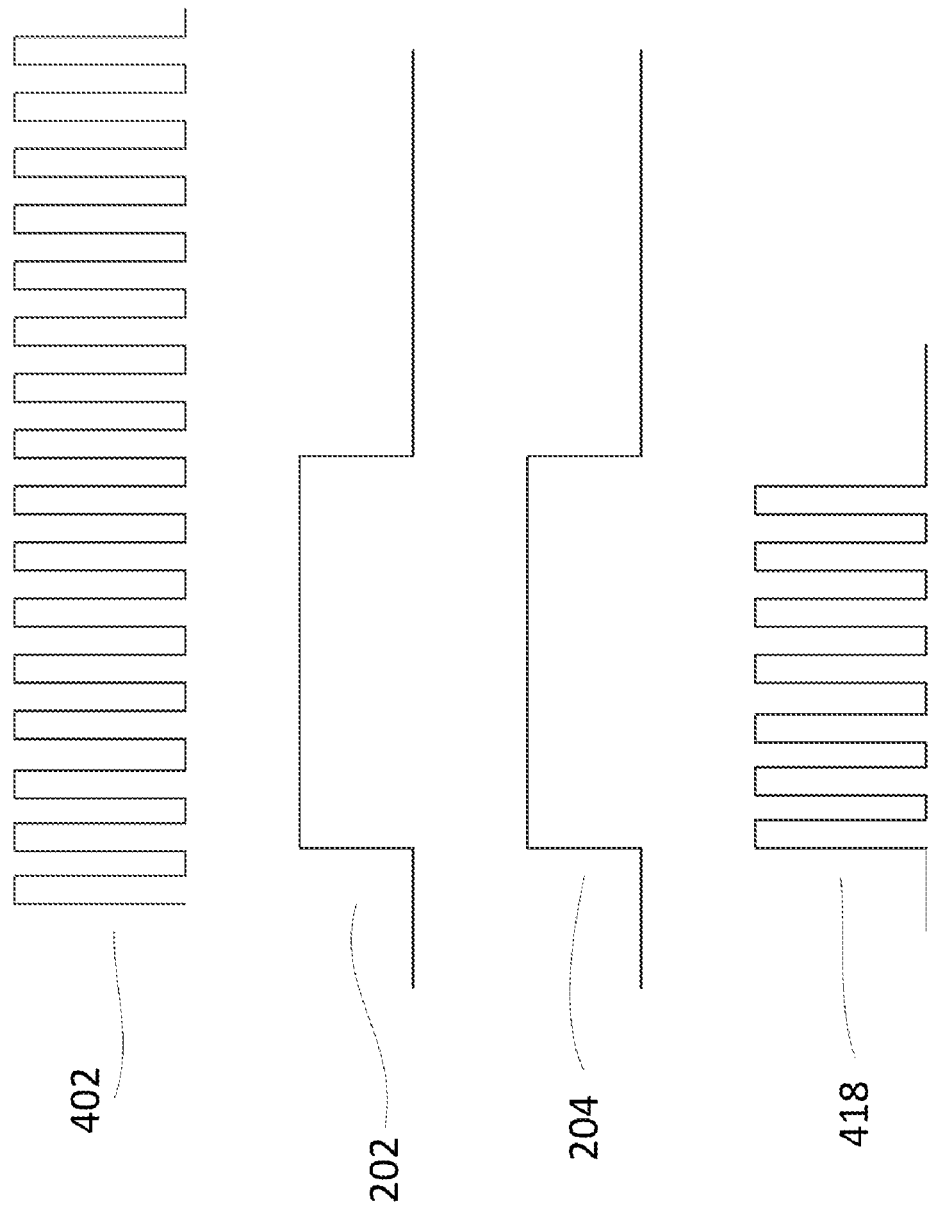

FIG. 8 illustrates a plurality of waveforms used in the circuit of FIG. 4 in a constant power mode according to an embodiment.

Figure 9:
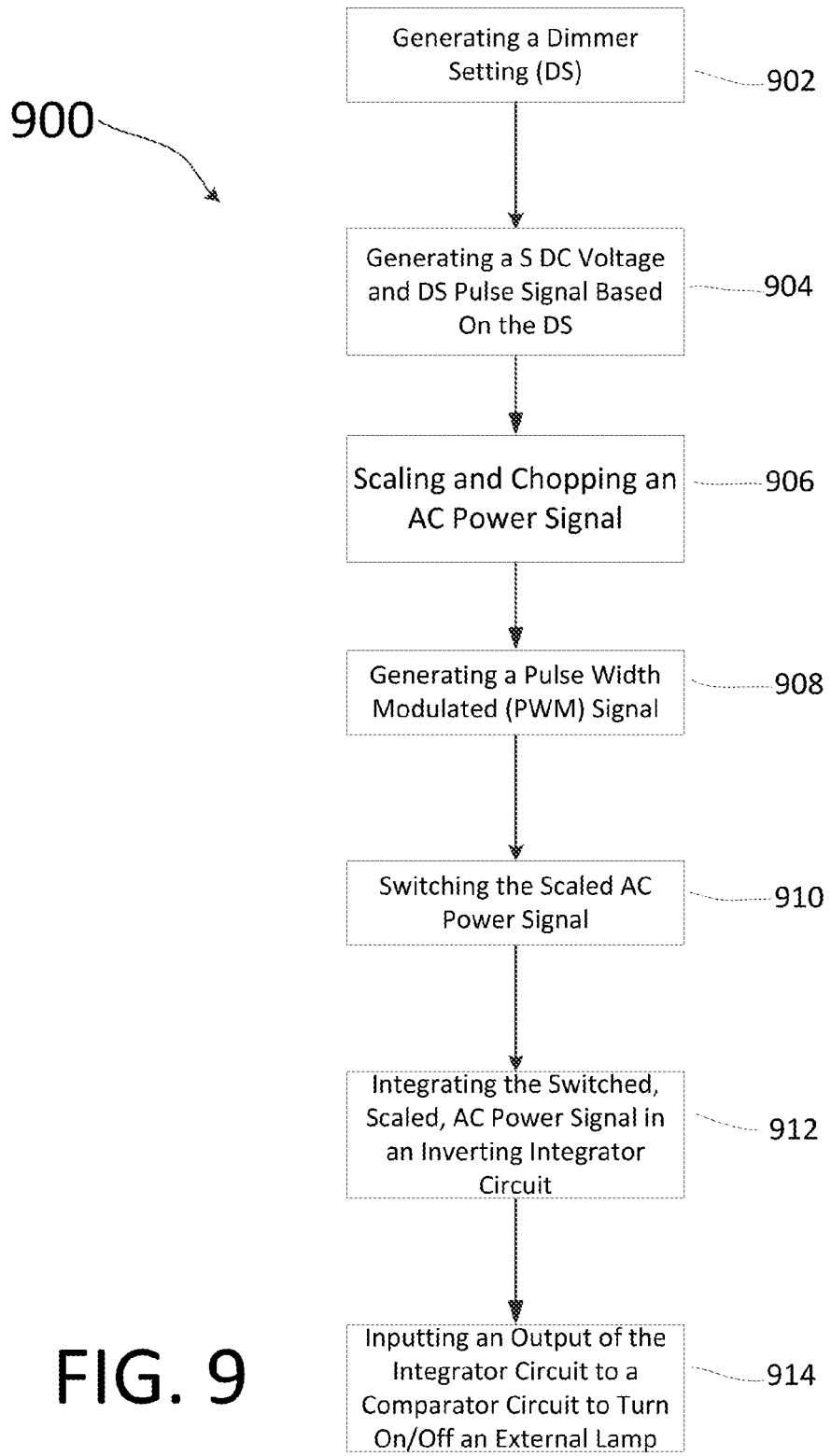

FIG. 9 illustrates a flowchart of a method for dimming a lamp such that the energy expended in the lamp is substantially constant from cycle-to-cycle regardless of a magnitude difference in the input AC voltage according to an embodiment.

LIST OF REFERENCE NUMBERS FOR THE MAJOR ELEMENTS IN THE DRAWING

The following is a list of the major elements in the drawings in numerical order.

100 Wall-Mounted Dimming Control Apparatus
102 House AC Power (HOT_Power)
104 Neutral Line (Neutral)
106 Wall-Mounted Box
108 Dimming Control Circuitry
110 DIM_Hot Output
112 Lamp
114 Switch
202 FET_A_DRV_1 Input Signal
204 FET_B_DRV_1 Input Signal
206 First N-Channel MOSFET Transistor (Transistor) Q1
208 Second N-Channel MOSFET Transistor (Transistor) Q2
210 FET Drive Circuitry
212 First Opto-isolator
214 Second Opto-isolator
216 DIM Switch Board
302 AC Voltage Waveform with an Over-Voltage (Over-voltage) Condition
304 AC Voltage Waveform with an Under-Voltage (Under-Voltage) Condition
306 First Volt-Sec Product
308 Second Volt-Sec Product
310 Third Volt-Sec Product
400 Voltage-Time Integrator and Constant Power Circuit
402 HOT_V_PWM Signal
404 HOT_RDiv Signal
406 DIM_Set Signal
408 Pulse Width Modulator Circuit
410 Resistor-divider Network
412 60 HZ_Positive
414 120 HZ_0X Signal
416 AND gate
418 AND Gate Output Signal
420 Non-inverting Amplifier
422 Analog Switch
424 DIM_Hot Internal Signal
426 Resettable Inverting Integrator Circuit
427 Reset Switch Transistor
428 ʃDIM_Hot Signal
430 Zero Reference Comparator
432 Dimming Level Comparator
434 Logical "OR" Gate
436 Latch
438 FET_Drive_Control
440 Zero-Cross Circuit
442 FET Drive Dimming Control Circuitry
444 Third Opto-isolator
446 Fourth Opto-isolator

DETAILED DESCRIPTION OF THE EMBODIMENTS

The embodiments described herein are generally implemented as part of a lighting control system suitable for use in substantially or wholly reducing or eliminating flicker when using a dimming control feature. Hence, an illustrative dimming control system and its operation according to embodiments will be described herein.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to."
Mode(S) for Carrying Out the Invention Aspects of different embodiments are described herein in the context of a circuit for providing dimming controls of incandescent lamps, but is not limited thereto, except as may be set forth expressly in the appended claims.

FIGS. 4A-4D illustrate voltage-time integrator and constant power circuit (circuit) 400 for use in dimming lamps 112 substantially without flicker through use of either or both a voltage-second integrator mode and a constant power mode according to an embodiment. Circuit 400, as shown in FIG. 4A, includes AND gate 416, non-inverting amplifier 420, analog switch 422, and resettable inverting integrator circuit 426, which includes reset switch transistor 427. FIG. 4B illustrates dimming level comparator 432, zero reference comparator 430, OR gate 434, and latch 436. FIG. 4C illustrates PWM circuit 408, which generates HOT_v_PWM signal 402, and zero cross circuit 440, which generates 60 HZ_POS signal 412 and 120 HZ_0X signal 414. FIG. 4D, described in greater detail below, illustrates FET Drive dimming circuitry 442, which includes third and fourth opto-isolators 444, 446 controlled by FET-Drive control signal 438. FIGS. 4A-4D will be referenced from hereon in as FIG. 4, and described in conjunction with FIGS. 5 and 6, both of which illustrate a plurality of waveforms generated by, or used within, circuit 400 illustrated in FIG. 4 when used according to the voltage-second integrator mode according to an embodiment.

As discussed above, for a fixed resistance lamp load, the amount of energy delivered to the lamp during each ½ cycle is dependent on the "volt-second" product of Dim-Hot output 110 (shown in FIG. 1) connected to lamp 112. Because the ½ cycle conduction intervals of a reverse phase dimmer are set by fixed time intervals for achieving desired brightness, the energy delivered to a lamp load during each ½ cycle will vary with any asymmetry in the AC line voltage, causing flicker in lamp 112. According to an embodiment, circuit 400 addresses this AC line condition and reduces lamp flicker, by controlling the ½ cycle conduction intervals to force the voltage-second products of consecutive ½ cycles to be substantially equal.

According to further embodiments, circuit 400, with its circuit common referenced to Hot_Power 102, achieves substantially flicker-free operation by integrating the volt-sec product of each DIM-HOT ½ cycle output using resettable inverting integrator circuit 426, consisting of an amplifier circuit with a capacitor in the feedback loop, and a reset transistor switch. According to further embodiments, the amplifier can be in the form of an operational (OP) amplifier (amp), which is shown in a non-limiting manner as resettable inverting integrator circuit 426. In order to convey the different aspects of the embodiments, discussion will first be made of the voltage-second integrator mode of circuit 400, as if the constant-power mode does not affect operation, and then discussion will be made of the constant power mode, in reference to FIGS. 4, 7, and 8; to this end, HOT_V_PWM signal 402 will be discussed briefly in regard to the operation of AND gate 416, but is discussed in greater detail in regard to the constant power mode further below.

Referring to FIG. 4, AND gate 416 receives as inputs FET_A_Drive_1 input signal 202, FET_B_Drive_2 input signal 204 and HOT_V_PWM input signal 402, which together form AND gate output signal 418 that is input to the switching input of analog switch 422; these waveforms are shown in FIG. 8. HOT_V_PWM input signal 402 input to AND gate 416 is discussed in greater detail below, in regard to the constant power mode feature of circuit 400. Analog switch 422 generates a signal DIM_Hot internal 424 that is equivalent to that of DIM_Hot output 110 (shown and discussed above in regard to FIG. 1) by gating a scaled neutral-to hot line voltage, HOT_RDiv 404 to resettable inverting integrator 426, in response to the two FET drive signals, FET_A_Drive_1 input signal 202 and FET_B_Drive_1 signal 204. The two FET drive signals, FET_A_Drive_1 input signal 202 and FET_B_Drive_1 signal 204, are generated by FET Drive dimming control circuit 442, shown in FIG. 4D. Those of skill in the art can appreciate that the circuit of FIG. 4D is similar to that of FIG. 2, but now includes third and fourth opto-isolators 444, 446, which are controlled by FET_Drive control signal 438, according to embodiments. The incoming Neutral Line 104 of the input 120 VAC voltage, HOT_Power 102, is scaled using resistor-divider network 410, and buffered by amplifier 420, producing HOT_RDiv signal 404, which is then input as the analog input to analog switch 422. According to an embodiment, the level or magnitude of HOT_RDiv signal 404 is about $\frac{1}{100}^{th}$ of the level or magnitude of the input AC Neutral 104 voltage, with respect to HOT_Power 102, which is typically 115 VAC RMS. As those of skill in the art can appreciate, different scaling factors can be used, dependent upon different lighting and lamp and dimming situations and conditions, and as such the aforementioned embodiment should not be taken in a limiting manner. As those of skill in the art can further appreciate, one use of non-inverting amplifier 420 is to isolate the impedance of resistor-divider network 410 from the input of resettable inverting-integrator circuit 426. Thus, according to a further embodiment, non-inverting amplifier 420 is set to a unity gain, such that the output voltage level is essentially the same as the input voltage level.

The output of analog switch 422, because it is gated by AND gate output signal 418, which is created by the logical AND combination of FET_A_Drive_1 input signal 202 and FET_B_Drive_1 signal 204 and HOT_V_PWM signal 402 (which is a relatively high-frequency square wave, most of the time), is a chopped, version of the input voltage HOT_RDiv signal 404. A grossly exaggerated detailed view of one portion of the output of analog switch 422, DIM_Hot internal 424, is shown in FIG. 6. In FIG. 6, it can be seen that what appears to be a smooth signal in FIG. 5 (DIM_Hot internal signal 424) is really a series of increasing "squared-off" waves. The reason the waves are described as "squared-off" is that as the gate or switch closes, the output voltage of analog switch 422 follows substantially closely that of the voltage at its input; so if the input voltage is rising, so too is the output voltage. Then, as the switch opens up, the output voltage falls sharply to zero for the brief period of time that the logical AND product of the aforementioned inputs to AND gate 416 is a logical zero. Thus, there are a series of rising "squared-off" waves that when viewed in a larger time scale appear fairly smooth, and when viewed in a finer time scale appear with the outline of a sine wave, but gated. When the HOT_RDiv signal 404 becomes negative, the Dim_Hot internal signal 424 becomes inverted, and contains a series of negative going transitions, as shown in the waveform of FIG. 6.

According to a further embodiment, since the FET drive signals are the same signals used to control transistors Q1, Q2, 206, 208 of the bi-directional switch (as shown in FIG. 1), then analog switch U3-B 422 produces a proportionally scaled representation of the volt-sec product of the DIM_Hot output 110 connected to the load (i.e., lamp 112).

With reference to FIG. 4, 120 HZ_0X signal 414, which is generated from zero-cross circuit 440 is coincident with both the positive and negative going ½ cycles of HOT_Power 102, as shown in FIG. 5. As shown in FIG. 5, 120 HZ_0X signal 414 occurs twice as often as 60 HZ_POS signal 412, which is generated only on the positive transition of HOT_Power 102. 120 HZ_0X signal 414 resets the output of latch 436, FET_Drive_Control signal 438, to its high state, which causes transistors Q1, Q2, 206, 208, to be turned on. According to an embodiment, both of FET_A_Drive_1 input signal 202 and FET_B_Drive_1 signal 204 of FIGS. 1 and 2 are controlled by FET_Drive_Control signal 438. Those of skill in the art can appreciate that the circuitry of FIG. 4 can be implemented in a conventional looking wall-mounted dimming control apparatus, similar to that as shown FIG. 1, but which now incorporates the features and advantages of the aspects of the embodiments for producing substantially flicker free operation in the dimming of lamp(s) 112 according to an embodiment. The control logic is arranged, as shown in FIG. 4D, such that the high state of FET_Drive_Control signal 438 allows FET_A_Drive_1 input 202 and FET_B_Drive_1 input 204 to turn on transistors Q1, Q2, 206, 208, through operation of third and fourth opto-isolators 444, 446. When FET_Drive_Control signal 438 is in its low state, transistors Q1, Q2, 206, 208 are turned off, regardless of the state of FET_A_Drive_1 input 202 and FET_B_Drive_1 input 204.

During the on-time interval of transistors Q1, Q2, 206, 208, the output of analog switch 422, DIM_Hot internal signal 424, is integrated by resettable inverting integrator circuit 426, such that it "integrates up" towards the level of DIM_Set signal 406 that corresponds to a particular desired brightness. In FIG. 5, the integrated output signal of resettable inverting integrator circuit 426 is ∫Dim_Hot signal 428 and the "integrate-up" portion is shown at 428a. The dimmer setting level (DIM_Set signal 406) is generated by FET drive circuitry 210, and is input to dimming level comparator 432.

In regard to signal levels, by way of a non-limiting example, HOT_Power 102 is conventionally about 115 VAC RMS and resistor divider network divides this by 100, such that the signal level of HOT_RDiv 404 is about 1.15 VAC RMS, as is the output of analog switch 422. Component values of input resistor R8 and integration capacitor C1 of resettable inverting integrator circuit 426, are selected to generate an output swing between about 0 and about 3V peak. Therefore, according to an embodiment, a non-limiting example of DIM_Set 406 would be that it too can vary from about 0 VDC to about 3 VDC to establish the minimum and maximum brightness levels, respectively. As those of skill in the art can appreciate, hysteresis control of comparators 430, 432, in this current configuration, is not required as the very first state change will set the "latch", which will then ignore any other state change until after being reset by 120 HZ_0X, but can be in other configurations, according to further embodiments. As those of skill of art can appreciate the aforementioned example is just an example of the signal levels, and other voltages can be used, depending on lamp loads and/or local/available power sources as the case may be, and as such, the example values or not to be taken in a limiting manner.

According to further embodiments, the level of DIM_Set signal 406 can be directly proportional to the desired brightness setting (i.e., a lower brightness setting would have a lower voltage level than a higher brightness setting), or inversely proportional to the desired brightness setting (i.e., a lower brightness setting would have a higher voltage level than a higher brightness setting), with a corresponding change in component configuration.

Once the output of resettable inverting integrator circuit 416, ∫Dim_Hot signal 428, reaches the provided level of DIM_Set signal 406 (in FIG. 5, the level of DIM_Set signal 406 is the horizontal signal level shown in regard to ∫DIM_HOT signal 428, discussed below), the output of dimming level comparator 432 switches to a logic "high" state to toggle output 438 of latch 436, to a logic "low" state, terminating the drive to transistors Q1, Q2, 206, 208 of the bi-directional switch shown in FIG. 1.

At this point, according to an embodiment, resettable inverting integrator circuit 426 holds its output level, as its input is now open and disconnected via the off-state of analog switch 422. In FIG. 5, this is shown at 428b. According to a further embodiment, the output level of resettable inverting integrator 426 represents the volt-sec product of the actual voltage supplied to the lamp load, DIM_Hot output 110, during the conducting portion of the positive ½ cycle of the AC input voltage, HOT_Power 102. The volt-sec product, which represents the energy that is provided to lamp 112, is illustrated by ∫DIM_Hot signal 428 in FIG. 5; that is, while the volt-sec product of DIM_Hot output 110 is the actual voltage that is applied to lamp 112, ∫DIM_Hot signal 428 provides an indication or representation of how that volt-sec product is formed such that it is substantially equal over non-uniform cycles of the input power, HOT_Power 110, according to an embodiment.

As those of skill in the art can appreciate, the amount of energy that is delivered to lamp 112 is directly proportional the volt-sec product of the conducting cycle of DIM_Hot output 112 because, for the majority of the time, aside from its first very brief warm-up period, the lamp-load resistance of lamp 112 is substantially constant. Therefore, according to an embodiment, the level of ∫DIM_Hot signal 428, which varies as a result of integration by resettable inverting integrator circuit 426, provides a substantially precise indication of the energy being delivered to lamp 112.

The next occurrence of 120 HZ__0X signal 414 (shown in FIG. 5 as 120 HZ__0X signal 414b), coincident with the negative going ½ cycle of the AC input (Hot_Power 102), resets output 438 of latch 436 to a logic high signal, to once again enable FET_Drive_Control signal 438 to turn on transistors Q1, Q2, 206, 208, of the bi-directional switch. Because DIM_Hot internal signal 424—the output of analog switch 422 is now "positive going"—resettable inverting integrator circuit 426 "integrates down," (because it is an inverting amplifier) starting from its previous level that represents the energy delivered during the positive ½ cycle of the AC input. In FIG. 5, this is shown at 428c. Those of skill in the art can readily appreciate that the values of the input resistor and feedback capacitor of resettable inverting integrator circuit 426 can be chosen to change the integration time and amplification according to properties of operational amplifiers that are known to those of skill in the art as well as the parameters of the input signal (i.e., the 60 Hz frequency of AC power in the United States); other values can be used for different countries that have different VAC RMS levels and operating frequencies. Thus, a detailed discussion of the design of resettable inverting integrator circuit 426 beyond that what has been described herein has been omitted in fulfillment of the dual purposes of clarity and brevity.

Resettable inverting integrator circuit 426 integrates down until its output reaches about zero volts (according to an embodiment, the lower threshold is set to about 10 mV; though, as one of skill in the art can appreciate, the lower or "zero" threshold can be set to a different voltage dependent upon a specific circuit configuration and values, which can change from application to application), which is then detected by zero reference comparator 430, which then switches its output to a logic level high, toggling output 438 of latch 436 to its logic level low state again to turn off transistors Q1, Q2, 206, 208, of the bi-directional switch shown in FIG. 1. 60 Hz_POS signal 412, also generated by zero threshold circuit 440, resets resettable inverting integrator circuit 426 on each positive transition of HOT_Power 102 by providing a discharge path for the capacitor in the feedback loop of resettable inverting integrator circuit 426 via transistor Q1 as shown in FIG. 4. Thus, according to an embodiment, charge is not built up or retained by the capacitor from cycle to cycle, and a substantially true and accurate integrated voltage signal is generated on each of the positive and negative transitions of HOT_RDiv signal 404 according to an embodiment.

According to an embodiment, by integrating DIM_Hot internal 428 "up from zero" to a set level (DIM_Set 406), and then integrating DIM_Hot 428 "down to zero", the volt-sec products of consecutive ½ cycle intervals are forced to be substantially equal to each other by adjusting the "on" times of transistors Q1, Q2, 206, 208, of the bi-directional switch (in dimming control circuitry 108) so that the energy delivered during consecutive ½ cycles will be equal to each other. According to further embodiments, resettable inverting integrator circuit 426, which embodies the "up from zero/down to zero" integration scheme, provides substantially similar energy products over asymmetrical AC waveform conditions as also shown in FIG. 5.

Referring again to FIG. 5, after the first four ½ cycles, the very next positive ½ cycle has an increased amplitude (shown as HOT_RDiv signal 404a) that would normally result in a brightness increase (lamp flicker) for a fixed on-time dimmer. In this case, resettable inverting integrator circuit 426 minimizes the brightness increase, because now resettable inverting integrator circuit 426 integrates up towards the level DIM_Set signal 406 at a faster rate (because of the increased voltage at the input of resettable inverting integrator circuit 426), shown in FIG. 5, at 428d, reaching it in an amount of time that is reduced in direct proportion to the AC amplitude increase, although in a scaled manner.

According to further embodiments, the increased integration rate of resettable inverting integrator circuit 426 causes the volt-sec product of DIM_Hot internal signal 424a to be substantially representative of the actual volt-sec product of HOT_Power output 110, and for the actual volt-sec product of HOT_Power output 110 when HOT_RDIV signal 404 experiences an overvoltage situation to be substantially similar to that of the previous "normal amplitude" HOT_RDIV signals 404 (i.e., the previous ½ cycles of HOT_RDiv signal 404), compensating for what would have been a significant energy increase to the lamp for the increased amplitude ½ cycle. The compensation is shown by FET_Drive_Control signal 438, portion 438a, showing a reduced time high state, coincident with DIM_Hot internal signal 424a.

Similarly, as shown in regard to HOT_RDIV signal 404b, the amplitude has again increased, albeit in a more or greater negative direction. In this case, according to further embodiments, resettable inverting integrator circuit 426 integrates down from its previously held value towards zero at a faster rate (shown in FIG. 5 at 428e), reaching zero in an amount of time that is reduced in direct proportion to the amplitude increase (of DIM_HOT_internal signal 424b) according to embodiments. In substantially the same manner as described above for a positive amplitude increase, operation of circuit 400 and resettable inverting integrator circuit 426 results in compensating for the energy increase to lamp 112 during the increased negative amplitude HOT_RDIV signal 404b, thereby minimizing lamp flicker.

According to further embodiments, circuit 400 further includes a constant power mode feature that regulates the root-mean-square (RMS) voltage level of the DIM_Hot output signal 110, over about a 2:1 range in regard to the input AC input line voltage, HOT_Power 102. According to embodiments, the constant power mode is achieved using a "Feed Forward" control loop, such that the RMS output of DIM_Hot internal signal 424 is kept substantially constant, even as the AC input line level changes.

According to further embodiments, the constant power mode of circuit 400 enables dimmer 100 to achieve its constant power mode for slower changes in the AC input voltage (HOT_Power 102), as well as "flicker compensation" for lamp loads, normally caused by faster changes in cycle-to-cycle voltage peaks. The constant power mode uses an averaging filter to accumulate about 3-cycles of the input AC voltage, i.e. 50 msec, which causes a response over a relatively small number of cycles, as opposed to an instantaneous response.

According to embodiments, the feed forward loop of the constant power mode uses a pulse width modulated (PWM) control signal that is proportional to the level of the input AC signal, HOT_Power 102, averaged over at least 3 cycles. PWM circuit 408 generates the PWM signal, 402, which is proportional to the 3 cycle average of 102. HOT_V_PWM signal 402, the AC-level proportional signal, is shown in FIG. 4 and is used to modulate the on-time of analog switch 422. HOT_V_PWM 402 is derived by a voltage-to-duty cycle pulse PWM control circuit 408 (the details of which are not shown, in fulfillment of the dual purposes of clarity and brevity), which scales the AC input Neutral line 104, with reference to voltage HOT_Power 102, and generates a hi-frequency PWM signal proportional to the RMS level of the AC input. That is, the larger the RMS voltage of the AC input voltage (HOT_Power 102), the greater the duty cycle of HOT_V_PWM 402. As those of skill in the art can appreciate, generation of such a signal can be readily comprehended and understood, and so for the reasons mentioned above, the details of that circuit have not been included herein.

Referring back again to FIG. 4, AND Gate 416 combines HOT_V_PWM signal 402 with FET_A_DRIVE_1 and FET_B_DRIVE_2 signals 202, 204, such that analog switch 422 is on only when all three of these signals are in their logic high state, as shown in FIG. 8. According to an embodiment, the operating frequency of HOT_V_PWM signal 402 is set to about 12 kHz, which is about 200 times that of the AC input 60 Hz line voltage frequency. According to further embodiments, the operating frequency of HOT_V_PWM signal 402 is, at a lower threshold, about 100 times the AC voltage line frequency, i.e., about 6 kHz, to minimize sampling related errors, and according to further embodiments, the operating frequency of HOT_V_PWM signal 402 is, at an upper threshold, about 500 kHz.

According to an embodiment, AND Gate 416 controls the "on-state" of analog switch 422 and thus provides resettable inverting integrator circuit 426 with a "signal time duration" equal to the conduction interval of DIM_Hot internal signal 424 and a signal amplitude equal to a scaled RMS value of the AC input voltage (HOT_Power 102). As discussed above, and according to an embodiment, the analog input signal to resettable inverting integrator circuit 426 is gated through analog switch 422 by the same signal that sets the conduction time duration of first and second transistors Q1, Q2, 206, 208 of the bi-directional switch (FET_A_DRIVE and FET_B_DRIVE signals 202, 204). As a result, the integration signal time duration of resettable inverting integrator circuit 426 is equal to the conduction interval of DIM_Hot internal signal 424.

Furthermore, because the duty cycle of HOT_V_PWM signal 402 is proportional to the RMS level of HOT_Power 102, the actual signal level gated through to resettable inverting integrator circuit 426 is proportional to the RMS level of HOT_Power 102 as well, because, as the duty cycle increases from an increase in the RMS level of HOT_Power 102, the duration of the gated analog signal (DIM_Hot internal signal 424) increases by the same amount; conversely, if the duty cycle of HOT_V_PWM signal 402 decreases from a decrease in the RMS level of HOT_Power 102, the duration of the gated analog signal (DIM_Hot internal signal 424) decreases by the same amount as well.

According to embodiments, acting together, the voltage-second integrator mode and constant power mode of circuit 400 regulate the RMS value of DIM_Hot internal signal 424, such that it remains substantially constant even as the AC input voltage level (HOT_Power 102) changes. According to further embodiments, by regulating the RMS value of DIM_Hot internal signal 424, a substantially constant power operating mode is achieved, as the power supplied to a resistive load is proportional to the square of its RMS voltage, $V_{rms}^2$.

Referring to FIG. 7, several waveforms will now be discussed that illustrate aspects of the embodiments regarding constant power mode operation of circuit 400. The waveforms shown in FIG. 7 illustrate $V_{rms}$ regulation that achieves substantially constant power mode operation over an input voltage range, or ratio, of about 2:1 according to a non-limiting example. Those of skill in the art can appreciate that use of the input voltage ratio of about 2:1 is merely for purposes of illustration and is not to be construed as a limitation of circuit 400 as other input voltage ratios are possible (i.e., compensation for other voltage ranges is possible, e.g., 3:1, 4:1, among others). Thus, for purposes of illustration only, FIG. 7 illustrates operation of circuit 400 implementing a constant power mode of operation wherein a 200 $V_{rms}$ and 100 $V_{rms}$ signals are input to circuit 400. As those of skill in the art can appreciate, the 2:1 ratio is just but one example illustrating the dynamic range of circuit 400 according to an embodiment. That is, a 2:1 ratio provides compensation for a change in voltage from about 120 VAC to about 240 VAC. The same is true for a 1:2 ratio, i.e. from about 240 VAC to about 120 VAC. As those of skill in the art can appreciate, the line voltage generally does not change over a 2:1 or 1:2 range, as a ±10% is generally more likely. However, according to different aspects of the embodiments, circuit 400 can compensate when the operating "Dim level" (DIM_Set signal 406) is such that it can be held constant while the input AC voltage changes. According to a non-limiting example, if DIM_Set signal 406 is set to about 50% and the AC line voltage is at about 240 VAC, then if the AC line starts to decrease towards 120 VAC, circuit 400 would maintain the 50% dimming level, all the way down to 120 VAC. According to another non-limiting example, if DIM_Set signal 406 is set to about 100% and the AC line is 120 VAC, then circuit 400 would maintain the 100% level for line voltages all the up to 240 VAC. Accordingly, the constant power mode of circuit 400 maintains the power at a substantially constant level if there is sufficient margin between the Dim_Set signal 406 level and input voltage level change.

Shown in FIG. 7, for purposes of discussion only, is a square-wave AC input voltage that is used to illustrate how circuit 400 achieves its constant power mode of operation according to embodiments. As those of skill in the art can appreciate, typically the input AC voltage would not be a square wave; however, in fulfillment of the dual purposes of clarity and brevity, it is simpler to illustrate the principles of operation of the constant power mode of operation of circuit 400 if HOT_Power 102 is illustrated as a square wave, and hence for the purposes of discussion of FIG. 7 only, and the constant power mode of operation of circuit 400, the input AC voltage will be referred to as HOT_Power 102' (as opposed to HOT_Power 102). Furthermore, all of the signals generated in circuit 400 as described in reference to FIG. 7 will be similarly designated. As those of skill in the art can appreciate, however, there are instances in which inverters provide power in the form of square waves. Thus, in certain power outage instances where sites are operating on back-up power systems using "battery powered inverters," the AC line would be an actual square-wave voltage.

Referring to the top line of FIG. 7, the magnitude of HOT_Power 102a' is equal to about $100 V_{rms}$. The dimming level signal, DIM_Set signal 406', is set such that DIM_Hot internal signal 424', the signal output from analog switch 422, is operating at a duty cycle "D" of about 50%, according to the following expression:

$$D = \frac{t_{On}}{T}, \qquad (1)$$

wherein $t_{on}$ is the "on" time (or logic level "high"), and T is the period. As with DIM_Hot internal signal 424, the actual signal is a composite of very quickly switched square waves, with an amplitude substantially equal to that of the scaled down value of HOT_RDiv signal 404, very similar to the sinusoidal signal shown in FIG. 6, but as a square wave.

As those of skill in the art can appreciate, in this case, the RMS voltage of DIM_HOT Internal signal 424a' is equal to:

$$V_{rms} = V_{pk} \times \sqrt{D} \qquad (2),$$

wherein, $V_{pk}$ is the maximum voltage of DIM_Hot internal signal 424a'. In this case, the RMS value of DIM_Hot internal signal 424a' is determined as follows:

$$V_{rms}(\text{DIM\_Hot Internal Signal 424}a') = 100 \text{ V} \times \sqrt{\frac{2}{4}} = 71 \text{ V}_{rms}. \qquad (3)$$

The corresponding ∫DIM_Hot signal 428a' integrates up and reaches the level of DIM_Set signal 406 in a time interval equal to "1", and then integrates back down to zero in an equal time interval, i.e. "1". As those of skill in the art can appreciate, the time interval has been normalized, i.e., made to equal unity, in order to aid in simplifying the discussion and to further show how circuit 400 operates in terms of how the integration rates change. Because the input voltage is a square wave, in this case, the integrate-up signal is essentially linear, as is the integrate-down signal, and the resulting waveform substantially resembles a trapezoid. The integration up and down times, as with the analog case and volt-sec mode discussed above, is directly proportional to the input voltage level (DIM_Hot internal signal 424a') according to embodiments.

A second example of the previous calculations is also shown in FIG. 7. In the second example, $V_{in}$, or HOT_Power 102b', increases from $100 V_{rms}$ to $200 V_{rms}$, but because of the operation of the feed forward loop of resettable inverting integrator circuit 426, the output level of ∫DIM_Hot signal 428b' is still held at its previous RMS level of 71 $V_{rms}$. According to embodiments the RMS output level of ∫DIM_Hot 428b' is maintained substantially constant because of the following two actions: first, the integration time interval is reduced by one-half because of the doubling of input voltage (i.e., from $100 V_{rms}$ to $200 V_{rms}$), and secondly, the integration time interval is reduced by an additional one-half by another doubling of the input signal level caused by the doubling of the feed forward switch PWM duty cycle (duty cycle of HOT_V_PWM signal 402 from 50% to 100%). Therefore, according to an embodiment, the integration time interval is proportional to the change in input voltage level according to the following expression:

$$\text{Int\_Time}_{New} = \left(\frac{V_{stand}}{V_{new}}\right)^2 \times \text{Int\_Time}_{stand}, \qquad (4)$$

wherein, $\text{Int\_Time}_{New}$ is the new integration time for the "new" or "changed-to" voltage ($V_{new}$), $V_{stand}$ is the predetermined standard value of the input voltage (i.e., 115 VAC RMS=HOT_Power 102; however, in the examples discussed with respect to FIG. 7, $V_{stand}$=$100 V_{rms}$), and $\text{Int\_Time}_{stand}$ is the corresponding integration time of resettable inverting integrator circuit 426 with regard to the standard input voltage. The standard values discussed above are for purposes of illustration only, and are not meant to be and should not be construed in a limiting manner, as other "standard" input values can be used, dependent upon other circumstances. It can be appreciated by those of the skill in the art that the change in integration time can decrease if the value of the input voltage decreases, according to further embodiments.

According the second example shown in FIG. 7, the combined result is that ∫DIM_Hot signal 428b' now integrates up and reaches the level of DIM_Set signal 406 in a time interval equal to 25% of the original (or "standard," for purposes of this discussion) time interval, and then integrates back down to zero in equal time, i.e. [(1÷2)÷2]=0.25. According to further embodiments, when the input voltage equals 200 $V_{rms}$, the positive and negative ½ cycle conduction times, DIM_HOT internal signal 424b', are now equal to 25% of DIM_Hot internal signal 424a' (when HOT_Power 102a' is equal to 100 $V_{rms}$), and the total conduction time, $t_{on}$, is equal to "0.5".

The following calculations show, in a manner similar to the case in which the "standard" values were used, the determination of $V_{rms}$ and other values. In this case, the RMS voltage DIM_Hot internal signal 424b' is equal to:

$$D = \frac{t_{On}}{T}; D_{new} = \frac{0.5}{4} = 0.125, \qquad (5)$$

$$V_{rms} = V_{pk} \times \sqrt{D}, \qquad (6)$$

$$V_{rms}(\text{DIM Hot Internal Signal 424}b') = 200 \text{ V} \times \sqrt{\frac{0.5}{4}} = 71 \text{ V}_{rms}. \qquad (7)$$

According to further embodiments, the result is that the RMS value of DIM_Hot internal signal 424b' remains at the same level for both input voltage levels, i.e. 100 $V_{rms}$ and 200 $V_{rms}$, so that a substantially constant power mode is realized.

FIG. 9 illustrates a flowchart of method 900 for dimming lamp 112 such that energy expended in lamp 112 is substantially constant from cycle-to-cycle regardless of a magnitude difference in the input AC voltage according to an embodiment. Method 900 begins with step 902, wherein a dimmer setting (DS) is generated by a user. In step 904, a DS direct current (DC) Level Signal and a DS pulse signal based on the dimmer setting is generated. In method step 906, HOT_Power 102 is scaled to create HOT_RDiv signal 404, the scaled AC power input voltage that is then input to non-inverting amplifier 420. In step 908, HOT_V_PWM signal 402 is generated by PWM circuit 408. As those of skill in the art can appreciate, although method 900 is written, by necessity, as a sequential set of steps, it should be understood that the order in which the steps occur is generally immaterial, and indeed, most if not all of the steps happen or can happen substantially simultaneously, or in an order different than what is portrayed in FIG. 9.

Following step 908, in step 910, the scaled input AC power voltage, HOT_RDiv 404, is switched by analog switching circuit 422 to create DIM_Hot internal signal 424, which is then input to resettable inverting integrator circuit 426. DIM_Hot signal 424 is created by switching analog switching circuit 422 with a signal generated by a logical AND combination of HOT_V_PWM 402, and the DS pulse signal discussed above in regard to method step 904 (actually FET_A_Drive_1 signal 202, and FET_B_Drive_1 signal 204). The duty cycle of the HOT_V_PWM signal 402 is proportional to the magnitude of HOT_Power 102.

In method step 912, which generally describes operation of resettable inverting integrator circuit 426 (discussed in greater detail above in regard to FIG. 4, and other figures), the output of analog switching circuit 422 is input to resettable inverting integrator circuit 426 such that a rise time of an output of the integrator circuit is proportional to a positive amplitude of the switched scaled AC power Signal, and a fall time of the output of the integrator circuit is proportional to a negative amplitude of the switched scaled AC power signal. In this manner, as described in greater detail above, the energy provided to lamp 112 on a cycle-to-cycle basis of HOT_Power 102 is maintained substantially constant even though there might be changes in the magnitude. As further described above, HOT_V_PWM signal 402 described in greater detail above also effects changes in the energy delivered to lamps 112 based on a change in the duty cycle of POT_V_PWM signal 402, which is dependent upon an amplitude of HOT_Power 102.

Then, in method step 914, the output of the integrator circuit is provided to a comparator/latch circuit (430, 432, 434, and 436). After being reset at the positive-going zero-crossing of the input AC voltage (60 HZ_POS 412), the output of the integrator circuit rises from 0 Volts to the DC DS Level Signal (i.e., DIM_Set signal 406), at which point lamp 112 is turned off, by comparator 432 and latch circuit 436. At the next 120 Hz zero-crossing (120 HZ_0X 414), latch circuit 436 is reset such that lamp 112 is turned on. When the output of the integrator circuit falls from the DC DS level signal and reaches 0 volts, lamp 112 is turned off by comparator 430 and latch circuit 436. That is, lamp 112 is on during the rise time and fall time of the output of resettable inverting integrator circuit 426, and is off (due to operation of other signals, such as 60 HZ_POS signal 412, and 120 HZ_0X signal 414) when the output of resettable inverting integrator circuit 426 is either at the level of DIM_Set signal 406, or at zero volts.

INDUSTRIAL APPLICABILITY

To solve the aforementioned problems, aspects of the embodiments provide a unique system in which a dimming circuit for a lighting system substantially prevents flicker from occurring.

LIST OF ACRONYMS USED IN THE DETAILED DESCRIPTION OF THE INVENTION

The following is a list of the acronyms used in the specification in alphabetical order.
AC Alternating Current
DC Direct Current
DS Dimmer Setting
Hz Hertz
MOSFET Metal Oxide Semiconducting Field Effect Transistor
LED Light Emitting Diode
PWM Pulse Width Modulated
RMS Root Mean Square Alternate Embodiments Alternate embodiments may be devised without departing from the spirit or the scope of the aspects of the embodiments presented and described herein.

What is claimed is:

1. A circuit for controlling dimming of a lamp, comprising:
a switching circuit configured to provide a chopped portion of an input AC power signal;
a resettable inverting integrator circuit configured to integrate the chopped portion of the input AC power signal such that
a rise time of an output of the resettable inverting integrator circuit is proportional to a positive amplitude of the chopped portion of the input AC power signal and
a fall time of the output of the resettable inverting integrator is proportional to a negative amplitude of the chopped portion, such that
an energy provided to the lamp based on the output of the resettable inverting integrator circuit is substantially equivalent from cycle-to-cycle of said input AC power signal regardless of a change in amplitude of the input AC power signal from cycle-to-cycle; and
a pulse width modulating (PWM) Circuit configures to generate a PWM signal, wherein a duty cycle of the PWM signal is directly proportional to a level of the input AC power signal, and further wherein
the rise time of an output of the resettable inverting integrator circuit increases as the duty cycle of the PWM signal decreases, and
the fall time of the output of the resettable inverting integrator circuit increases as the duty cycle of the PWM signal decreases.

2. The circuit according to claim 1, wherein
said duty cycle of the PWM signal is averaged over a first plurality of cycles of the input AC power signal.

3. The circuit according to claim 2, wherein the first plurality of cycles of the input AC power signal is about three cycles.

4. The circuit according to claim 1, wherein the switching circuit comprises:
an analog switch with an analog input, a switched analog output, and a switching input, and wherein
the analog input is connected to a scaled, non-inverted version of the input AC power signal, and wherein
the switching input is connected to a pulsed gated signal that includes a gate-width on-time and a plurality of pulsed signals within said gate width on-time, wherein the gate width is proportional to a desired brightness setting of the lamp, and wherein a duty cycle of the plurality of pulsed signals is proportional to a magnitude of the input AC power signal.

5. The circuit according to claim 4, wherein
a first duty cycle of the pulsed signals within the pulsed gated signal of about 50% represents a first magnitude of said input AC power signal, and further wherein
a second duty cycle of the pulsed signals within the pulsed gated signal of about 100% represents a second magnitude of about two times the first magnitude.

6. The circuit according to claim 1, wherein the resettable inverting integrator circuit comprises:
an inverting amplifier configured such that a first capacitor is placed in a feedback loop from an output of the inverting amplifier to an inverting input of the inverting amplifier and a first end of a first resistor is connected to the inverting input of the inverting amplifier and a second end of the first resistor is connected to an input signal; and a reset transistor configured such that a drain connection is connected to the output of the inverting amplifier, a source connection is connected to the inverting input of the inverting amplifier, and a gate is connected to a 60 Hz positive transition reset signal.

7. The circuit according to claim 6, wherein
when a 60 Hz positive transition reset signal pulse is received following a positive transition of the input AC power signal, the reset transistor is configured to cause a charge accumulated across the first capacitor to discharge upon each positive transition of the input AC power signal.

8. The circuit according to claim 6, further comprising:
a non-inverting amplifier that includes an input connected to a scaled version of the input AC power signal, and wherein
  the non-inverting amplifier is configured to buffer an input signal impedance from circuitry connected to an output of the non-inverting amplifier and further wherein
  the output is configured to generate a scaled, non-inverted version of the input AC power signal substantially equal in magnitude and polarity to the input signal; and
an analog switch with an analog input, a switched analog output, and a switching input, and wherein
  the analog input is connected to a scaled, non-inverted version of the input AC power signal, and wherein
  the switching input is connected to a pulsed gated signal that includes a gate-width on-time and a plurality of pulsed signals within said gate width on-time, wherein the gate width is proportional to an on-time of the lamp, and wherein a duty cycle of the plurality of pulsed signals is proportional to a magnitude of the input AC power signal.

9. The circuit according to claim 1, further comprising:
a dimming level circuit configured to generate a dimming level signal proportional to a predetermined brightness level;
a zero reference setting signal, set equal to about 10 mV above zero volts, wherein the zero reference setting signal represents a turn off condition of the lamp;
a 120 HZ zero volt transition signal, configured to provide a pulse on each zero voltage transition of the AC power signal;
a comparator circuit and a latch circuit, configured to compare the output of the resettable inverting integrator circuit to both of the dimming setting and zero reference signals and generate a latched lamp drive signal, such that
  when a first 120 HZ zero voltage transition occurs during a positive transition of a first AC power signal, a lamp drive signal is generated, in response to said output of the resettable inverting integrator circuit, to turn the lamp on until the output of the resettable inverting integrator circuit is substantially equal to the dimming level signal, whereupon the comparator and latch circuit are configured to turn off the lamp, and
  when a second 120 HZ zero voltage transition occurs during a negative transition of the first AC power signal, a lamp drive signal is generated, in response to said output of the resettable inverting integrator circuit, to turn the lamp on until the output of the resettable inverting integrator circuit is substantially equal to the zero reference setting signal, the comparator and latch circuit are configured to turn off the lamp.

10. A circuit for controlling dimming of a lamp, comprising:
a pulse width modulating (PWM) circuit configured to generate a PWM signal, wherein a duty cycle of the PWM signal is directly proportional to a level of the input AC power signal;
an analog switching circuit configured to provide a chopped portion of an input AC power signal, wherein said analog switching circuit includes an analog input, a switched analog output, and a switching input, and wherein
  the analog input is connected to a scaled, non-inverted version of the input AC power signal, and wherein
  the switching input is connected to the PWM signal that includes a gate-width on-time and a plurality of pulsed signals within said gate width on-time, wherein the gate width is proportional to a desired brightness setting of the lamp, and wherein a duty cycle of the plurality of pulsed signals in the PWM signal is proportional to a magnitude of the input AC power signal; and
a resettable inverting integrator circuit configured to integrate the chopped portion of the input AC power signal, and wherein
  a rise time of an output of the resettable inverting integrator circuit is proportional to a positive amplitude of the chopped portion of the input AC power signal, and
  a fall time of the output of the resettable inverting integrator circuit is proportional to a negative amplitude of the chopped portion, and further wherein
  an energy provided to the lamp based on the output of the resettable inverting integrator circuit is substantially equivalent from cycle-to-cycle of said input AC power signal regardless of a change in amplitude of the input AC power signal from cycle-to-cycle, and further wherein
  the rise time of an output of the resettable inverting integrator circuit increases as the duty cycle of the PWM signal decreases, and
  the fall time of the output of the resettable inverting integrator circuit increases as the duty cycle of the PWM signal decreases.

11. The circuit according to claim 10, wherein
a first duty cycle of the pulsed signals within the pulsed gated signal of about 50% represents a first magnitude of said input AC power signal, and further wherein
a second duty cycle of the pulsed signals within the pulsed gated signal of about 100% represents a second magnitude of about two times the first magnitude.

12. The circuit according to claim 11, wherein
said duty cycle of the PWM signal is averaged over a first plurality of cycles of the input AC power signal.

13. The circuit according to claim 12, wherein the first plurality of cycles of the input AC power signal is about three cycles.

14. The circuit according to claim 10, wherein the resettable inverting integrator circuit comprises:
an inverting amplifier configured such that a first capacitor is placed in a feedback loop from an output of the inverting amplifier to an inverting input of the inverting amplifier and a first end of a first resistor is connected to the inverting input of the inverting amplifier and a second end of the first resistor is connected to an input signal; and a reset transistor configured such that a drain connection is connected to the output of the inverting amplifier, a source connection is connected to the inverting input of the inverting amplifier, and a gate connection is connected to a 60 Hz positive transition reset signal.

15. The circuit according to claim 14, wherein
when a 60 Hz positive transition reset signal pulse is received following a positive transition of the input AC power signal, the reset transistor is configured to cause a charge accumulated across the first capacitor to discharge upon each positive transition of the input AC power signal.

16. The circuit according to claim 10, wherein
a first duty cycle of the pulsed signals within the pulsed gated signal of about 50% represents a first magnitude of said input AC power signal, and further wherein
a second duty cycle of the pulsed signals within the pulsed gated signal of about 100% represents a second magnitude of about two times the first magnitude.

17. The circuit according to claim 10, further comprising:
a dimming level circuit configured to generate a dimming level signal proportional to a predetermined brightness level;
a zero reference setting signal, set equal to about 10 mV above zero volts, wherein the zero reference setting signal represents a turn off condition of the lamp;
a 120 HZ zero volt transition signal, configured to provide a pulse on each zero voltage transition of the AC power signal;
a comparator circuit and a latch circuit, configured to compare the output of the resettable inverting integrator circuit to both of the dimming setting and zero reference signals and generate a latched lamp drive signal, such that
when a first 120 HZ zero voltage transition occurs during a positive transition of a first AC power signal, a lamp drive signal is generated, in response to said output of the resettable inverting integrator circuit, to turn the lamp on until the output of the resettable inverting integrator circuit is substantially equal to the dimming level signal, whereupon the comparator and latch circuit are configured to turn off the lamp, and
when a second 120 HZ zero voltage transition occurs during a negative transition of the first AC power signal, a lamp drive signal is generated, in response to said output of the resettable inverting integrator circuit, to turn the lamp on until the output of the resettable inverting integrator circuit is substantially equal to the zero reference setting signal, whereupon the comparator and latch circuit are configured to turn off the lamp.

18. A method for controlling dimming of a lamp, comprising:
providing a chopped portion of an input AC power signal;
integrating the chopped portion of the input AC power signal in a resettable inverting integrator circuit such that
a rise time of an output of the resettable inverting integrator circuit is proportional to a positive amplitude of the chopped portion of the input AC power signal and
a fall time of the output of the resettable inverting integrator circuit is proportional to a negative amplitude of the chopped portion, such that
an energy provided to the lamp based on the output of the resettable inverting integrator circuit is substantially equivalent from cycle-to-cycle of said input AC power signal regardless of a change in amplitude of the input AC power signal from cycle-to-cycle; and
generating pulse width modulated signal using a PWM circuit, wherein a duty cycle of the PWM signal is directly proportional to a level of the input AC power signal, and further wherein
the rise of an output of the resettable inverting integrator circuit increases as the duty cycle of the PWM signal decreases, and
the fall of the output of the resettable inverting integrator circuit increases as the duty cycle of the PWM signal decreases.

19. The method according to claim 18, wherein
said duty cycle of the PWM signal is averaged over a first plurality of cycles of the input AC power signal.

20. The method according to claim 19, wherein the first plurality of cycles of the input AC power signal is about three cycles.

21. The method according to claim 18, wherein the step of providing a chopped portion of an input AC power signal comprises:
connecting an input of an analog switch with a scaled, non-inverted version of the input AC power signal; and
connecting a switching input of the analog switch to a pulsed gated signal that includes a gate-width on-time and a plurality of pulsed signals within said gate width on-time, wherein the gate width is proportional to a desired brightness setting of the lamp, and wherein a duty cycle of the plurality of pulsed signals is proportional to a magnitude of the input AC power signal.

22. The method according to claim 21, wherein
a first duty cycle of the pulsed signals within the pulsed gated signal of about 50% represents a first magnitude of said input AC power signal, and further wherein
a second duty cycle of the pulsed signals within the pulsed gated signal of about 100% represents a second magnitude of about two times the first magnitude.

23. The method according to claim 18, wherein the step of integrating the chopped portion of the input AC power signal comprises:
amplifying the chopped portion of the input AC signal through an inverting amplifier configured such that a first capacitor is placed in a feedback loop from an output of the inverting amplifier to an inverting input of the inverting amplifier and a first end of a first resistor is connected to the inverting input of the inverting amplifier and a second end of the first resistor is connected to an input signal; and
resetting the output of the inverting amplifier through operation of a reset transistor configured such that a drain connection is connected to the output of the inverting amplifier, a source connection is connected to the inverting input of the inverting amplifier, and a gate is connected to a 60 Hz positive transition reset signal, and wherein
resetting occurs upon each positive transition of the 60 Hz positive transition reset signal pulse such that the reset transistor causes a charge accumulated across the first capacitor to discharge.

24. The method according to claim 23, further comprising:
providing the output of the resettable inverting integrator circuit to a comparator/latch circuit, such that
when the output of the resettable inverting integrator circuit rises from about 0 Volts to the level of the DC DS Level signal, the lamp is turned on, and when the output of the resettable inverting integrator circuit falls from about the level of the DC DS level signal, the lamp is turned on, and during other times, the lamp is off.

* * * * *